(12) United States Patent
Miller

(10) Patent No.: US 9,587,469 B2
(45) Date of Patent: Mar. 7, 2017

(54) POLY(ALKYENYLAMIDE)-POLYSACCHARIDE HYDROGELS FOR TREATMENT OF SUBTERRANEAN FORMATIONS

(71) Applicant: Halliburton Energy Services, Inc., Houston, TX (US)

(72) Inventor: Matthew Lynn Miller, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/948,620

(22) Filed: Jul. 23, 2013

(65) Prior Publication Data
US 2015/0027710 A1  Jan. 29, 2015

(51) Int. Cl.
| | | |
|---|---|---|
| C09K 8/42 | (2006.01) | |
| E21B 43/12 | (2006.01) | |
| C09K 8/514 | (2006.01) | |
| C09K 8/68 | (2006.01) | |
| C09K 8/88 | (2006.01) | |
| C09K 8/90 | (2006.01) | |

(52) U.S. Cl.
CPC .............. *E21B 43/12* (2013.01); *C09K 8/426* (2013.01); *C09K 8/514* (2013.01); *C09K 8/68* (2013.01); *C09K 8/685* (2013.01); *C09K 8/887* (2013.01); *C09K 8/90* (2013.01)

(58) Field of Classification Search
CPC ...... E21B 33/1291; E21B 43/26; E21B 19/00; E21B 43/16; E21B 43/267; E21B 47/00; E21B 10/00; E21B 17/00; E21B 19/22; E21B 21/003; E21B 23/02; E21B 33/12; E21B 33/128; E21B 34/10; E21B 41/0092; E21B 3/00; E21B 41/00; E21B 41/0021; E21B 43/006; E21B 43/04; E21B 43/088; E21B 43/108; E21B 43/114; E21B 43/116; E21B 43/12; E21B 43/126; E21B 43/128; E21B 43/14; E21B 43/168; E21B 43/24; C09K 2208/08; C09K 17/14; C09K 17/40; C09K 2208/30; C09K 2208/32; C09K 3/22; C09K 8/12; C09K 8/206; C09K 8/32; C09K 8/40; C09K 8/42; C09K 8/44; C09K 8/46; C09K 8/487; C09K 8/516
See application file for complete search history.

(56) References Cited

U.S. PATENT DOCUMENTS

| | | | | |
|---|---|---|---|---|
| 3,766,984 A | * | 10/1973 | Nimerick | C09K 8/887 166/294 |
| 5,563,186 A | * | 10/1996 | Thompson | C08B 37/0084 507/209 |
| 5,888,943 A | | 3/1999 | Diggs et al. | |
| 6,110,876 A | | 8/2000 | Diggs et al. | |
| 6,153,669 A | | 11/2000 | Diggs | |
| 6,983,799 B2 | | 1/2006 | Reddy et al. | |
| 7,866,394 B2 | | 1/2011 | Creel et al. | |
| 7,891,424 B2 | | 2/2011 | Creel et al. | |
| 2006/0234870 A1 | | 10/2006 | Mccabe et al. | |
| 2009/0205829 A1 | | 8/2009 | Sullivan et al. | |
| 2009/0270280 A1 | * | 10/2009 | Zhang | C09K 8/82 507/211 |
| 2012/0190593 A1 | | 7/2012 | Soane et al. | |

FOREIGN PATENT DOCUMENTS

WO  WO-2015013306 A1  1/2015

OTHER PUBLICATIONS https://commons.wikimedia.org/wiki/ File: Acrylamide_gel.svg downloaded on May 3, 2016.*
https://en.wikipedia.org/w/index.php?title=Alginic_acid &printable=yes p. 1, downloaded on May 3, 2016.*
J. Y. Sun, X. Zhao et al. Highly stretchable and tough hydrogels, Nature, 2012, 489, 133-136.*
"Highly stretchable and tough hydrogels—Supplementary Information", Nature, 489(7414), (2012), 1-17.
Sun, J.-Y., et al., "Highly stretchable and tough hydrogels", Nature, 489(7414), (2012), 133-136.
"International Application Serial No. PCT/US2014/047663, International Search Report mailed Nov. 3, 2014", 3 pgs.
"International Application Serial No. PCT/US2014/047663, Written Opinion mailed Nov. 3, 2014", 17 pgs.
Qmidian, Hossein, et al., "Elastic, Superporous Hydrogel Hybrids of Polyacrylamide and Sodium Alginate", *Macromolecular Bioscience*. 6(9), (2006), 703-710.
"International Application Serial No. PCT/US2014/047663, International Preliminary Report on Patentability mailed Feb. 4, 2016", 19 pgs.
"Australian Application Serial No. 2014293246, First Examiner Report mailed Apr. 6, 2016", 4 pgs.

* cited by examiner

*Primary Examiner* — Kumar R Bhushan
(74) *Attorney, Agent, or Firm* — Tenley Krueger Tumey L.L.P.

(57) ABSTRACT

The present invention provides compositions including poly (alkenylamide)-polysaccharide hydrogels for treating a subterranean formation and methods of using the same. In various embodiments, the present invention provides a method of treating a subterranean formation, including obtaining or providing a composition including a poly (alkenylamide)-polysaccharide hydrogel. The method also includes placing the composition in a subterranean formation. In some embodiments, the poly(alkenylamide)-polysaccharide hydrogel is a polyacrylamide-alginate hydrogel.

17 Claims, 7 Drawing Sheets

POLY(ALKYENYLAMIDE)-POLYSACCHARIDE HYDROGELS FOR TREATMENT OF SUBTERRANEAN FORMATIONS

BACKGROUND OF THE INVENTION

Undesired subterranean flow pathways intersecting wellbores designed for petroleum extraction can cause serious problems including interference from and contamination by water during cementing, extraction, and other downhole operations, as well as lost-circulation of drilling fluids and diversion of desired petroleum materials.

SUMMARY OF THE INVENTION

In various embodiments, the present invention provides a method of treating a subterranean formation. The method includes obtaining or providing a composition including a poly(alkenylamide)-polysaccharide hydrogel. The method also includes placing the composition in a subterranean formation. In some embodiments, the poly(alkenylamide)-polysaccharide hydrogel is a polyacrylamide-alginate hydrogel.

In various embodiments, the present invention provides a method of plugging a flow pathway in a subterranean formation. The method includes obtaining or providing a composition. The composition includes a poly(alkenylamide)-polysaccharide hydrogel. The method includes placing the composition in a subterranean formation. The subterranean formation includes a flow pathway. The method includes at least partially hydrating the hydrogel, to provide a composition including a hydrated hydrogel sufficient to substantially plug the flow pathway.

Various embodiments of the present invention provide certain advantages over other compositions for treating subterranean formations, such as compositions including hydrogels, and methods of using the same, at least some of which are unexpected. In some embodiments, the hydrogel of the present invention is tougher than other hydrogels, thereby providing a more effective plug for flow pathways. In some embodiments, the hydrogel can swell to a larger degree than other hydrogels, more effectively filling a pathway and substantially blocking flows into or out of the pathway. In some examples, the hydrogel can be more stretchable than other hydrogels, allowing it to stand up to a greater variety of downhole conditions than other gels. In various examples, the combined toughness and stretchability of the hydrogel provides a unique combination of characteristics that can help to minimize or eliminate flows into or out of flow pathways, saving time and money over other methods that do not plug pathways as quickly or as effectively. In some examples, the materials for forming the hydrogel are more cheaply available than other plugging materials, and can be crosslinked to form the gel more easily and with less cost than other materials. In addition, in various embodiments, the physical characteristics of toughness and stretchability can be unaffected or only slightly affected by the shape of the hydrogel or by imperfections in the hydrogel such as cuts or notches, unlike most other hydrogels. Insensitivity to shape, notches, or cuts can make various embodiments of the hydrogel more robust under a greater variety of downhole conditions and more able to effectively plug a greater variety of flow pathways. Various embodiments of the hydrogel can conform better to the flow pathway than other materials for plugging flow pathways, even if the pathway changes dimension, such as during surge and swab while tripping into or out of the wellbore.

In some embodiments, unexpectedly, the toughness and stretchability of the poly(alkenylamide)-polysaccharide hydrogel is greater than the sum of these characteristics in a hydrogel formed from the poly(alkenylamide) and a hydrogel formed from the polysaccharide. In some examples, the combination of the two materials in the hydrogel provides an unexpected synergistic combination that has characteristics uniquely well-suited for the plugging of undesirable downhole flow pathways. In some embodiments, the hydrogel can be at least partially biodegradable, and can be more biodegradable than hydrogels made from the individual components such as crosslinked poly(alkenylamide).

In various embodiments, the present invention provides a method of treating a subterranean formation. The method includes obtaining or providing a composition including a poly(alkenylamide)-polysaccharide hydrogel including structure $-(PAA)_{n1}-(CL)_{n2}-(PAA-PS)_{n3}-$. The variables PAA, CL, PAA-PS, and the repeating units of PAA, CL, and PAA-PS are in a block copolymer or random copolymer arrangement. The variable PAA has the structure

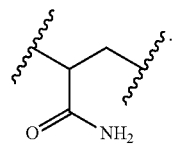

The variable CL has the structure

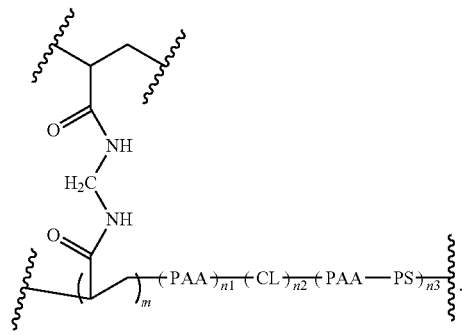

At each occurrence PAA-PS is part of the same polysaccharide or a different polysaccharide. The variable PAA-PS has the structure

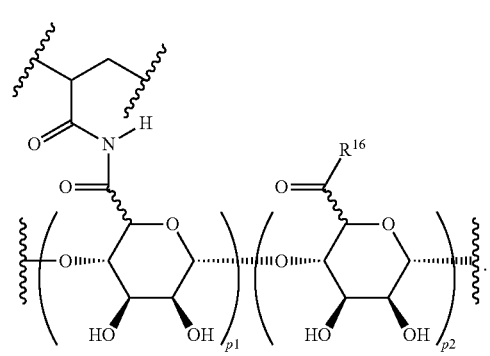

At each occurrence $R^{16}$ is independently selected from the group consisting of $-O^-$, $-OH$, and $-O^- Cl^+$, wherein at each occurrence CI⁺ is independently a counterion. The sum n1+n3 is about 10 to about 100,000, n2 is about 0 to about 10,000, and p1+p2 is about 10 to about 100,000. The method also includes placing the composition in a subterranean formation.

In various embodiments, the present invention provides a composition for treatment of a subterranean formation. The composition includes a poly(alkenylamide)-polysaccharide hydrogel. The poly(alkenylamide) includes the structure -(PAA)$_n$-. The variable PAA includes the structure

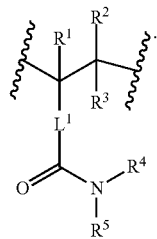

At each occurrence PAA independently occurs in the orientation shown or in the opposite orientation. Each of $R^1$, $R^2$, $R^3$, $R^4$, and $R^5$ at each occurrence is independently selected from the group consisting of —H and $C_1$-$C_{10}$ hydrocarbyl. At each occurrence $L^1$ is selected from the group consisting of a bond and $C_1$-$C_{10}$ hydrocarbylene. The variable n is at least about 2. The polysaccharide includes Structure I Structure I

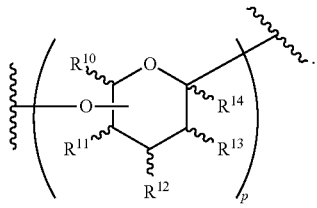

Each of $R^{10}$, $R^{11}$, $R^{12}$, $R^{13}$, and $R^{14}$ are independently selected from the group consisting of —H, —$R^{15}$, —$OR^{15}$, and —$C(O)R^{16}$. At each occurrence $R^{15}$ is independently selected from the group consisting of —H and $C_1$-$C_{10}$ hydrocarbyl. At each occurrence $R^{16}$ is independently selected from the group consisting of —O⁻, —OH, and —O⁻CI⁺. At each occurrence CI⁺ is independently a counterion, and p is at least about 2. The poly(alkenylamide)-polysaccharide hydrogel includes at least one crosslink between the poly(alkenylamide) and the polysaccharide including an imide.

In various embodiments, the present invention provides a composition for treatment of a subterranean formation. The composition includes a poly(alkenylamide)-polysaccharide hydrogel including the structure -(PAA)$_{n1}$-(CL)$_{n2}$-(PAA-PS)$_{n3}$-. The variables PAA, CL, PAA-PS, and the repeating units of PAA, CL, and PAA-PS, are in a block copolymer or random copolymer arrangement. The variable PAA has the structure

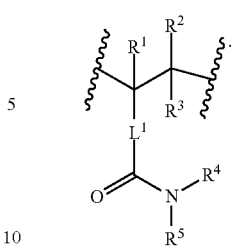

The variable CL has the structure

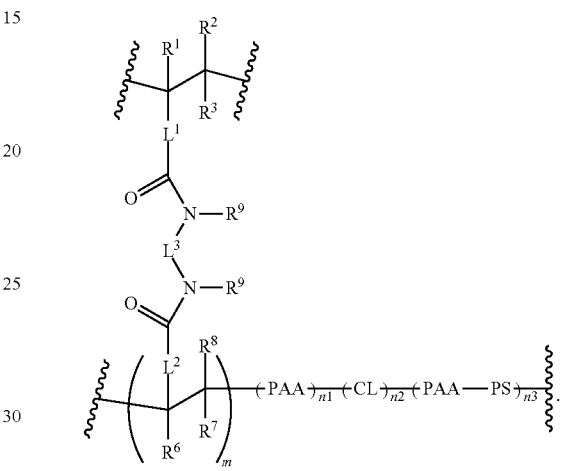

At each occurrence PAA-PS is part of the same polysaccharide or a different polysaccharide. The variable PAA-PS has the structure

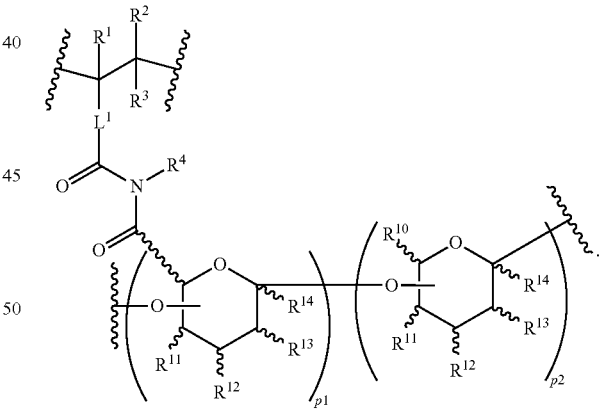

At each occurrence each of PAA, CL, and PAA-PS independently occurs in the orientation shown or in the opposite orientation. Each of $R^1$, $R^2$, $R^3$, $R^4$, and $R^5$ at each occurrence is independently selected from the group consisting of —H and $C_1$-$C_{10}$ hydrocarbyl. Each of $L^1$, $L^2$, and $L^3$ at each occurrence is selected from the group consisting of a bond and $C_1$-$C_{10}$ hydrocarbylene. Each of $R^{10}$, $R^{11}$, $R^{12}$, $R^{13}$, and $R^{14}$ are independently selected from the group consisting of —H, —$R^{15}$, —$OR^{15}$, and —$C(O)R^{16}$. At each occurrence $R^{15}$ is independently selected from the group consisting of —H and $C_1$-$C_{10}$ hydrocarbyl. At each occurrence $R^{16}$ is independently selected from the group consisting of —O⁻, —OH, and —O⁻CI⁺. At each occurrence CI⁺ is independently a counterion. The sum n1+n3 is at least about 2, n2 is about 0 to about 100,000,000, and p1+p2 is at least about 2.

In various embodiments, the present invention provides a composition for treatment of a subterranean formation. The composition includes a poly(alkenylamide)-polysaccharide hydrogel. The poly(alkenylamide) includes the structure -(PAA)$_n$-(CL)$_m$-. The poly(alkenylamide) is a block or random copolymer. The variable PAA has the structure

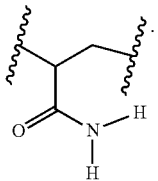

The variable n is about 10 to about 100,000. The variable CL has the structure

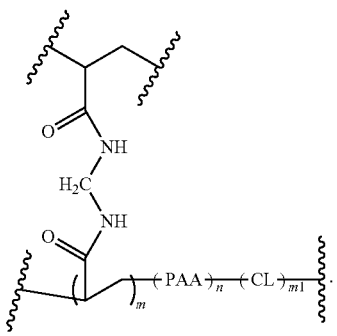

The variable m is about 1 to about 10,000, and m1 is about 0 to about 10,000. The polysaccharide includes Structure I Structure I

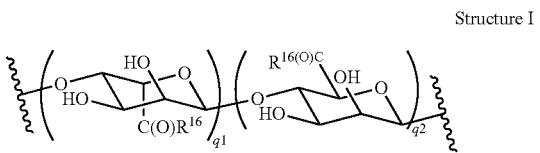

At each occurrence the variable R$^{16}$ is independently selected from the group consisting of —O⁻, —OH, and —O⁻CI⁺. At each occurrence CI⁺ is independently a counterion. The sum q1+q2=about 10 to about 100,000. The poly(alkenylamide)-polysaccharide hydrogel includes at least one crosslink between the poly(alkenylamide) and the polysaccharide including an imide.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2 inset a illustrates an alginate gel, wherein the G blocks on different polymer chains form ionic crosslinks. FIG. 2 inset b illustrates a polyacrylamide gel, the polymer chains form covalent crosslinks. FIG. 2 inset c illustrates an alginate-polyacrylamide gel, wherein the two types of polymer network are intertwined, and joined by covalent crosslinks between amine groups on polyacrylamide chains and carboxyl groups on alginate chains, in accordance with various embodiments.

DETAILED DESCRIPTION OF THE INVENTION

Figure 1:
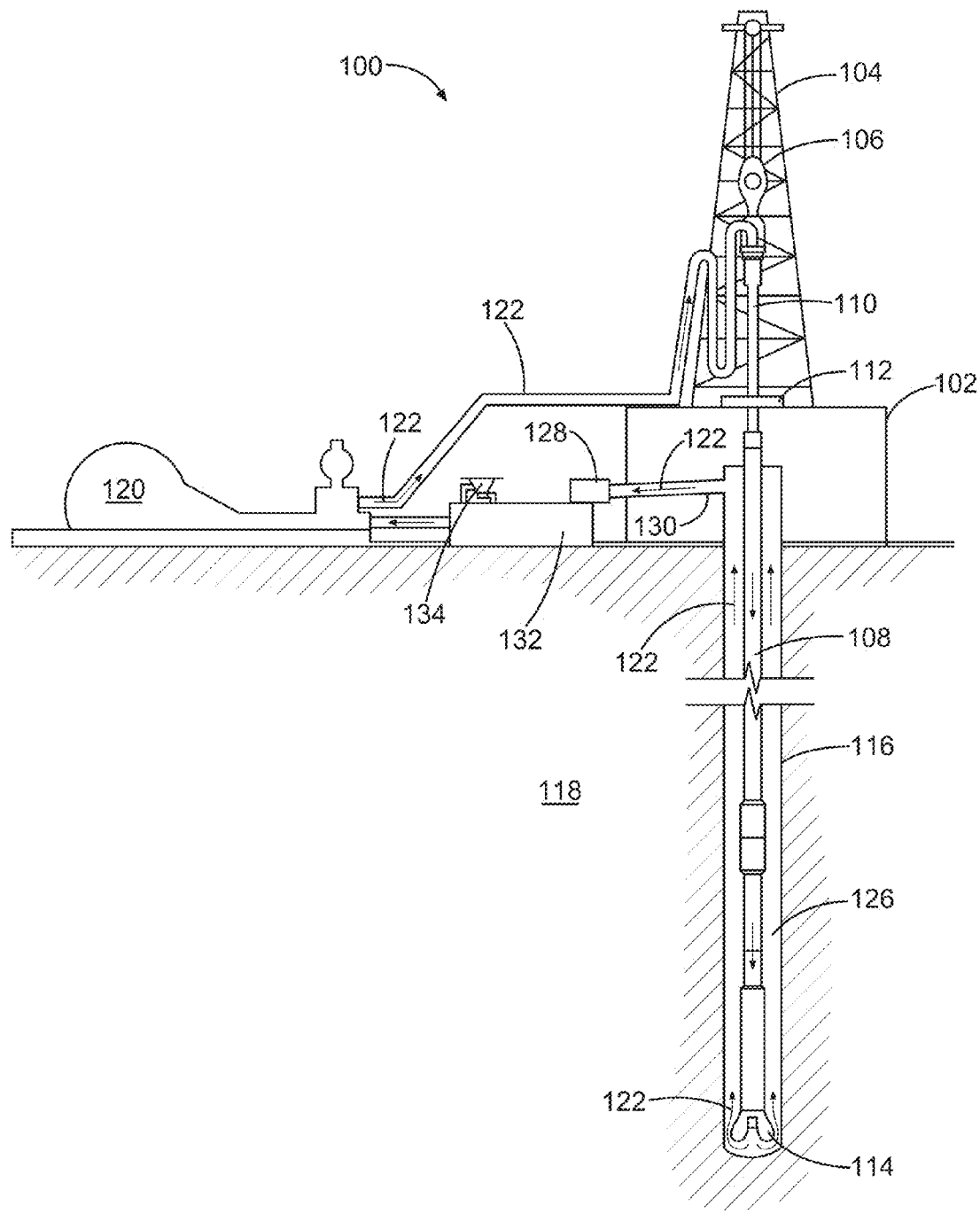
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group.

Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heterocyclyl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to R—$NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number average molecular weight can be measured by a variety of well-known methods including gel permeation chromatography, spectroscopic end group analysis and osmometry. If unspecified, molecular weights of polymers given herein are number-average molecular weights.

The term "weight-average molecular weight" as used herein refers ($M_w$), which is equal to $\Sigma M_i^2 n_i / \Sigma M_i n_i$, where $n_i$ is the number of molecules of molecular weight $M_i$. In various examples, the weight average molecular weight can be determined using light scattering, small angle neutron scattering, X-ray scattering, and sedimentation velocity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be an area desired to be fractured, a fracture or an area surrounding a fracture, a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can sufficient to divert from a wellbore, fracture, or flow pathway connected thereto at least one of water, a downhole fluid, or a produced hydrocarbon.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

Method of Treating a Subterranean Formation.

In various embodiments, the present invention provide a method of treating a subterranean formation. The method includes obtaining or providing a composition including a poly(alkenylamide)-polysaccharide hydrogel. The poly(alkenylamide)-polysaccharide hydrogel can be any poly(alkenylamide)-polysaccharide hydrogel described herein. The method also includes placing the composition in a subterranean formation. The placing of the composition in the subterranean formation can include contacting the composition with any suitable subterranean material downhole.

The obtaining or providing of the composition including a poly(alkenylamide)-polysaccharide hydrogel can occur at any time or location. In some embodiments, the composition is provided or obtained at least in part or substantially completely above the surface. For example, crosslinking of the poly(alkenylamide) and the polysaccharide can be performed at least in part or substantially completely above the surface to provide the hydrogel. In some embodiments, the composition is provided or obtained at least in part or substantially completely downhole. For example, the poly(alkenylamide) and the polysaccharide can be crosslinked at least in part or substantially completely downhole to provide the hydrogel. In some embodiments, the hydrogel is obtained or provided in a combination of above the surface and downhole, for example the poly(alkenylamide) and the polysaccharide can be at least partially crosslinked above the surface and at least partially crosslinked downhole. In some embodiments wherein crosslinking occurs downhole, the crosslinking can occur in any downhole location, such as at or near a subterranean material that is contacted with the hydrogel during the placement of the composition in the subterranean formation, or in any downhole location between the surface and a subterranean material that is contacted with the hydrogel during the placement of the composition in the subterranean formation.

The composition including the hydrogel, during transport from the surface or from the location wherein the composition is provided to the location in the subterranean formation wherein the composition is placed, can have any suitable viscosity at standard temperature and pressure or at downhole conditions. For example, the viscosity can be about 0.01 cP to about 100,000 cP, or about 0.01 cP to about 10,000 cP, or about 0.01 cP or less, or about 0.1 cP, 1 cP, 2, 3, 4, 5, 10, 15, 20, 50, 100, 200, 300, 400, 500, 1,000, 2,000, 3,000, 4,000, 5,000, 6,000, 7,000, 8,000, 9,000, 10,000, 15,000, 20,000, 50,000, 75,000, or about 100,000 cP or more.

The hydrogel that is obtained or provided, and independently, the hydrogel that is placed in the subterranean formation, and the hydrogel that can be contacted with the subterranean material downhole, can have any suitable amount of hydration, and can have the same or different levels of hydration after being obtained or provided and during the placing in the formation or the contacting with a subterranean material. In some embodiments, the hydrogel can be a hydrated hydrogel. The method can include at least partially hydrating the hydrogel, to provide a composition including a hydrated hydrogel. The hydrating can occur during the obtaining or providing of the hydrogel, and in some examples can occur at least one of before, during, and after placing the hydrogel in the subterranean formation or contacting the hydrogel with the subterranean material. In some examples, placing the hydrogel in the subterranean formation includes can include placing the hydrated hydrogel in the subterranean formation, or can include contacting the hydrated hydrogel with the subterranean material. In some examples, after obtaining or providing hydrogel, the method includes a step of dehydrating or drying the hydrogel prior to placing the hydrogel in the subterranean formation or prior to contacting the hydrogel with the subterranean formation, after which the method can optionally include hydrating the hydrogel.

The hydrating can be any suitable hydrating, such that any suitable amount of water or aqueous composition is taken up or absorbed by the hydrogel, for example about 1 wt % to about 100,000 wt % of the original (e.g., pre-hydrating step) weight of the hydrogel can be absorbed, or about 20 wt % to about 2,000 wt % of the original weight of the hydrogel is absorbed, or about 1 wt % or less, 2 wt %, 3, 4, 5, 10, 15, 20, 50, 75, 100, 150, 200, 300, 400, 500, 750, 1,000, 1,250, 1,500, 1,750, 2,000, 3,000, 4,000, 5,000, 10,000, 15,000, 20,000, 50,000, or about 100,000 wt % or more of the original weight of the hydrogel can be absorbed in water or aqueous composition. In some embodiments, the hydrating includes the hydrogel absorbing sufficient aqueous composition such that the hydrogel increases in volume by about 2 to about 2000 times, or about 10 to about 800 times, or about 2 times or less, or about 3, 4, 5, 7, 10, 15, 20, 25, 30, 40, 50, 70, 100, 120, 150, 200, 300, 400, 500, 600, 700, 800, 900, 1,000, 1,250, 1,500, 1,750, or about 2,000 times or more. The hydrating can occur over any suitable period of time, such as about 5 seconds to about 5 days, or about 5 seconds or less, 10 s, 20 s, 30 s, 1 minute, 2 min, 3 min, 4 min, 5 min, 10 min, 20 min, 30 min, 1 hour, 1.5 h, 2 h, 3 h, 4 h, 5 h, 10 h, 15 h, 20 h, 1 day, 1.5 d, 2 d, 3 d, 4 d, or about 5 days or more.

In various embodiments, the subterranean formation wherein the hydrogen is placed or the subterranean material contacted with the hydrogel includes a flow pathway. The flow pathway can be any downhole flow pathway, such as a water source, or such as a pathway sufficient to divert from the wellbore at least one of a downhole fluid or a produced hydrocarbon. The method can include hydrating the hydrogel before, during, or after the placement of the hydrogel in the subterranean formation or the contacting the hydrogel with the flow pathway, such that the hydrogel swells with water or other suitable aqueous composition, wherein the swollen hydrated hydrogel is sufficient to substantially plug the flow pathway. The plugged flow pathway can prevent or reduce interference of water from the flow pathway with downhole operations, and can prevent or reduce the diversion of fluids downhole through the flow pathway. Thus, in some embodiments the composition can be used as a lost-circulation material. The method can further include performing other downhole operations after the flow pathway is plugged with the hydrogel, such as petroleum extraction, drilling, or cementing. In some examples, after the flow pathway is plugged, the method can include contacting a cement slurry with at least part of the subterranean formation, and subsequently allowing the slurry to set.

The composition can include a carrier fluid, such as any suitable carrier fluid. The carrier fluid can be an aqueous carrier fluid such as water or brine. The carrier fluid can be an organic carrier fluid, such as any suitable organic solvent. In some examples, the carrier fluid can be ethylene glycol, dipropylene glycol methyl ether, dipropylene glycol dimethyl ether, dimethyl formamide, diethylene glycol methyl ether, ethylene glycol butyl ether, diethylene glycol butyl ether, propylene carbonate, limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, or a combination thereof. The hydrogel can be present in the carrier fluid in any suitable proportion, for example, the hydrogel can be 0.000,001 wt % to about 99.999,999 wt % of the composition, or about 0.1 wt % to about 99.9 wt % of the composition, or about 0.000,001 wt % or less, or about 0.000,01 wt %, 0.000,1, 0.001, 0.01, 0.1, 1, 2, 3, 4, 5, 10, 15, 20, 30, 40, 50, 60, 70, 80, 90, 95, 96, 97, 97, 99, 99.9, 99.99, 99.999, 99.999,9, 99.999,99, or about 99.999,999 wt % of the composition or more. The composition can include about 0.001 pounds to about 5.0 pounds per gallon of carrier fluid, or about 0.01 pounds to about 2.0 pounds per gallon of carrier fluid, or about 0.001 lbs/gal of carrier fluid, or about 0.01, 0.1, 1, 1.5, 2, 2.5, 3, 3.5, 4, 4.5, or about 5 lbs/gal of carrier fluid or more.

Poly(alkenylamide)-Polysaccharide Hydrogel.

The poly(alkenylamide)-polysaccharide hydrogel includes a reaction product of the poly(alkenylamide) and the polysaccharide. For example, the poly(alkenylamide)-polysaccharide hydrogel includes a reaction product of a crosslinking reaction between the poly(alkenylamide) and the polysaccharide. The crosslinking reaction can be any suitable crosslinking reaction, such that any suitable bond is formed between the poly(alkenylamide) and the polysaccharide, such as at least one covalent bond or ionic bond. In some examples, the crosslink can be an imide group (—C(O)—NH—C(O)—) formed by reaction of a carboxylic acid or carboxyl group on the polysaccharide and an amide nitrogen of the poly(alkenylamide). The hydrogel can include any suitable number of crosslinks between the poly(alkenylamide) and the polysaccharide.

The hydrogel can be in any suitable form in the composition. The hydrogel can be particles of any suitable size and shape within the composition, or the hydrogel can be a solid form or any suitable size or shape, or a combination thereof. In some embodiments, the composition includes hydrated hydrogel particles, for example in a drilling fluid. In some embodiments, the hydrogel includes dehydrated hydrogel particles in a composition that is placed in a subterranean formation including a flow pathway or is contacted with a downhole flow pathway wherein the hydrogel particles swell with water or other aqueous composition and plug the flow pathway. In some embodiments, the hydrogel can be hydrogel particles having any suitable size, such as any suitable average size (as determined by any suitable method), such as a size of about 0.001 mm to about 1000 mm, 0.01 mm to about 500 mm, or about 0.001 mm or less, or about 0.005 mm, 0.01, 0.05, 0.1, 0.5, 1.0, 1.5, 2, 3, 4, 5, 10, 15, 20, 25, 30, 40, 50, 75, 100, 150, 200, 250, 300, 350, 400, 450, 500, 550, 600, 650, 700, 750, 800, 850, 900, 950, or about 1,000 mm or more. For approximately spherical particles the size can be the diameter of the sphere, and for non-spherical or irregular particles the size can be the longest dimension of the particle.

The hydrogel can be in any suitable state of hydration. In some embodiments, the hydrogel is hydrated. In some embodiments, the hydrogel is substantially hydrated. The hydrated hydrogel can include any suitable proportion of water or aqueous composition, such as about 5 wt % to about 99.999 wt % water, or about 50 wt % to about 99.9 wt % water, or about 5 wt % water or less, or about 6 wt %, 7, 8, 9, 10, 15, 20, 25, 30, 35, 40, 45, 50, 55, 60, 65, 70, 75, 80, 85, 90, 95, 96, 97, 98, 99, 99.9, 99.99, or about 99.999 wt % water or more. The hydrated hydrogel can have any suitable toughness. In one example, toughness can be expressed in terms of the fracture energy, which can in one example be determined as described in the Examples as the work done by an applied force on the gel at a degree of stretch that causes a notch to transform into a running crack, divided by the product of the width and the thickness of the gel in an unstretched state. In some examples, the fracture energy of the hydrogel can be about 10 J·m$^{-2}$ to about 30,000 J·m$^{-2}$, or about 250 J·m$^{-2}$ to about 12,000 J·m$^{-2}$, or about 10 J·m$^{-2}$ or less, or about 20, 50, 100, 150, 200, 250, 300, 350, 400, 500, 600, 700, 800, 900, 1,000, 2,000, 3,000, 4,000, 5,000, 6,000, 7,000, 8,000, 9,000, 10,000, 11,000, 12,000, 15,000, 20,000, or about 30,000 J·m$^{-2}$ or more. The hydrated hydrogel can have sufficient stretchability that it can be stretched to any suitable length before breaking, such as about 10 to 100 times an original length before breaking, or about 15 to about 30 times an original length before breaking, or about 10 times an original length before breaking or less, or about 11, 12, 13, 14, 15, 16, 17, 18, 19, 20, 21, 22, 23, 24, 25, 26, 27, 28, 29, 30, 35, 40, 50, 60, 70, 80, 90, or about 100 times or more an original length before breaking.

The composition including the hydrogel, wherein the hydrogel is hydrated, such as substantially hydrated, can have any suitable viscosity at standard temperature and pressure, or under downhole conditions, such as at least about 50 cP, or about 50 cP to about 1,000,000,000 cP, or about 50 cP or less, or about 75 cP, 100, 150, 200, 300, 400, 500, 750, 1,000, 1,500, 2,000, 3,000, 4,000, 5,000, 10,000, 20,000, 50,000, 100,000, 150,000, 200,000, 500,000, 1,000, 000, 2,000,000, 5,000,000, 10,000,000, 100,000,000, 500, 000,000, or about 1,000,000,000 cP or more (e.g. the composition including the hydrated hydrogel can have essentially infinite viscosity at standard temperature and pressure or under downhole conditions).

In some embodiments, the hydrogel is dehydrated. In some embodiments, the hydrogel is substantially dehydrated. The dehydrated hydrogel can include any suitable proportion of water or aqueous composition, such as about 0.000,000,1 wt % water to about 80 wt % water, or about 0.000,000,1 wt % water to about 30 wt % water, or about 0.000,000,1 wt % water or less, or about 0.000,001 wt % water, 0.000,01, 0.000,1, 0.001, 0.01, 0.1, 1, 2, 3, 4, 5, 10, 15, 20, 25, 30, 35, 40, 45, 50, 55, 60, 65, 70, 75, or about 80 wt % water or more. The dehydrated hydrogel can have the same or different properties as the corresponding hydrated hydrogel.

The poly(alkenylamide)-polysaccharide hydrogel can be a reaction product (e.g. a crosslinking product) of a mixture of the poly(alkenylamide) and the polysaccharide wherein the poly(alkenylamide) and the polysaccharide have any suitable weight ratio in the reaction mixture that produces the hydrogel. For example, the poly(alkenylamide) can be present in about 30 wt % to about 99.999 wt % of the total weight of the polysaccharide and the poly(alkenylamide), or about 70 wt % to about 95 wt %, or about 0.1 wt % or less, or about 1 wt %, 5, 10, 15, 20, 25, 30, 35, 40, 45, 50, 55, 60, 65, 70, 75, 80, 85, 90, 95, 96, 97, 98, 99, 99.9, 99.99, or about 99.999 wt % or more of the total weight of the polysaccharide and the poly(alkenylamide).

In various embodiments, the poly(alkenylamide)-polysaccharide hydrogel can include a reaction product of the poly(alkenylamide) and the polysaccharide and additionally a methylene bisalkenylamide crosslinker, wherein the bisalkenylamide crosslinker is present in any suitable amount, such as about 0.000,1 wt % to about 10 wt % of the poly(alkenylamide), or about 0.01 wt % to about 0.12 wt %, or about 0.000,1 wt % or less, or about 0.000,5 wt %, 0.001, 0.005, 0.01, 0.02, 0.03, 0.04, 0.05, 0.06, 0.07, 0.08, 0.09, 0.1, 0.11, 0.12, 0.15, 0.20, 0.25, 0.3, 0.4, 0.5, 0.6, 0.7, 0.8, 0.9, 1, 2, 3, 4, 5, 6, 7, 8, 9, or about 10 wt % or more of the poly(alkenylamide).

In various embodiments, the poly(alkenylamide)-polysaccharide hydrogel includes a reaction product of the poly(alkenylamide) and the polysaccharide and a salt that provides an ionic crosslinker, wherein the salt is present in any suitable amount. In some examples the salt is one or more calcium salts, such as $CaSO_4$, $CaCl_2$, $CaI_2$, $CaBr_2$, $CaF_2$, $Ca(H_2PO_4)_2$, $CaHPO_4$, $Ca_3(PO_4)_2$, including an anhydrous form of the salt or a hydrated form of the salt. The salt can be present in the mixture of poly(alkenylamide) and polysaccharide that forms the hydrogel in an amount of about 0.01 wt % to about 40 wt % of the polysaccharide, or about 1 wt % to about 25 wt % of the polysaccharide, or about 0.01 wt % or less of the polysaccharide, or about 0.05, 0.1, 0.5, 1, 2, 4, 6, 8, 10, 12, 14, 16, 18, 20, 22, 24, 25, 30, 35, or about 40 wt % of the polysaccharide or more.

In various embodiments, the poly(alkenylamide)-polysaccharide hydrogel can include the structure -(PAA)$_{n1}$-(CL)$_{n2}$-(PAA-PS)$_{n3}$-. The variables PAA, CL, PAA-PS, and the repeating units of PAA, CL, and PAA-PS can be in a block copolymer or random copolymer arrangement. The variable PAA can have the structure

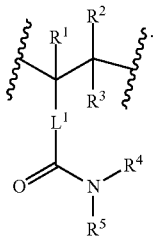

The variable CL can have the structure

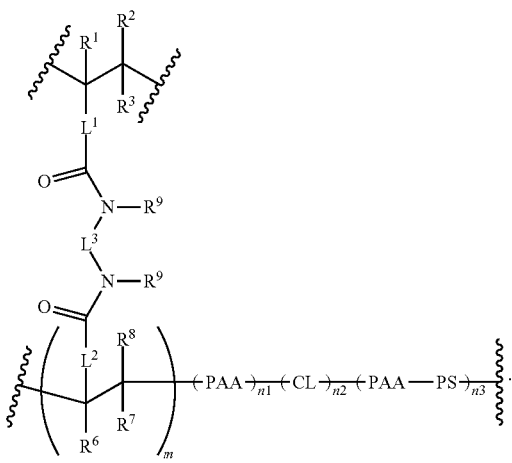

At each occurrence PAA-PS can be part of the same polysaccharide or a different polysaccharide. The variable PAA-PS can have the structure

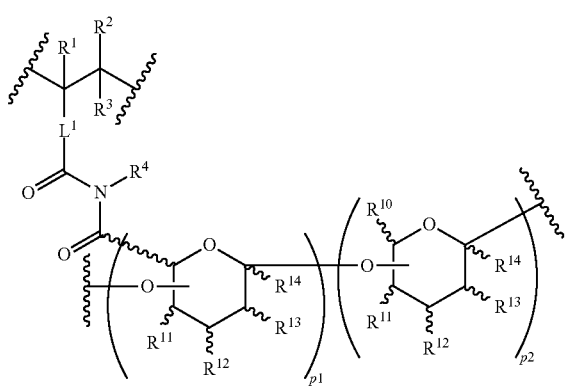

At each occurrence each of PAA, CL, and PAA-PS can independently occur in the orientation shown or in the opposite orientation. Each of $R^1$, $R^2$, $R^3$, $R^4$, and $R^5$ at each occurrence can be independently selected from the group consisting of —H and $C_1$-$C_{10}$ substituted or unsubstituted hydrocarbyl (e.g., a $C_1$-$C_{10}$ hydrocarbyl that is unsubstituted or substituted as defined herein). Each of $L^1$, $L^2$, and $L^3$ at each occurrence can be selected from the group consisting of a bond and $C_1$-$C_{10}$ substituted or unsubstituted hydrocarbylene. Each of $R^{10}$, $R^{11}$, $R^{12}$, $R^{13}$, and $R^{14}$ can be independently selected from the group consisting of —H, —$R^{15}$, —$OR^{15}$, and —$C(O)R^{16}$. At each occurrence $R^{15}$ can be independently selected from the group consisting of —H and $C_1$-$C_{10}$ substituted or unsubstituted hydrocarbyl. At each occurrence $R^{16}$ can be independently selected from the group consisting of —O$^-$, —OH, and —O$^-$CI$^+$. At each occurrence CI$^+$ can independently be a counterion. The sum n1+n3 can be at least about 2. The variable n2 can be about 0 to about 100,000,000. The sum p1+p2 can be at least about 2. In some embodiments, each of $R^1$, $R^2$, $R^3$, $R^4$, $R^6$, $R^7$, $R^8$, and $R^9$ can be —H. The variable $R^{10}$ can be —$C(O)R^{16}$. At each occurrence $R^{16}$ can be independently selected from the group consisting of —O$^-$, —OH, and —O$^-$CI$^+$. The variables $L^1$ and $L^2$ can be a bond. The variable $L^3$ can be methylene. The sum n1+n3 can be about 10 to about 100,000. The variable n2 can be about 0 to about 10,000. The sum p1+p2 can be about 10 to about 100,000.

In some embodiments, PAA can have the structure

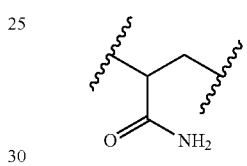

The variable CL can have the structure

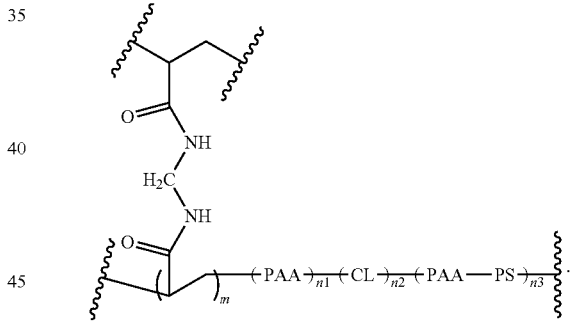

At each occurrence PAA-PS can be part of the same polysaccharide or a different polysaccharide. The variable PAA-PS can have the structure

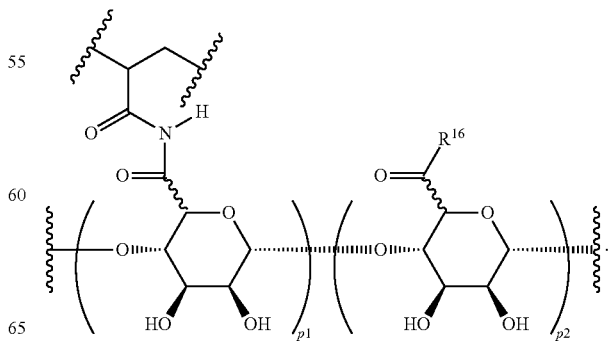

At each occurrence $R^{16}$ can be independently selected from the group consisting of —O⁻, —OH, and —O⁻CI⁺. At each occurrence CI⁺ can be independently a counterion. The sum n1+n3 can be about 10 to about 100,000. The variable n2 can be about 0 to about 10,000. The sum p1+p2 can be about 10 to about 100,000.

The variable m can have any suitable value. For example, m can be about 1 to about 10,000,000, or about 1 to about 10,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, or about 10,000,000 or more.

The variable n1 can have any suitable value. For example, n1 can be about 0 to about 100,000,000, or about 0 to about 100,000, or about 0, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000, 000, 2,000,000, 5,000,000, 10,000,000, 15,000,000, 20,000, 000, 50,000,000, or about 100,000,000 or more.

The variable n2 can have any suitable value. For example, n2 can be about 0 to about 100,000,000, or about 0 to about 100,000, or about 0, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000, 000, 2,000,000, 5,000,000, 10,000,000, 15,000,000, 20,000, 000, 50,000,000, or about 100,000,000 or more.

The variable n3 can have any suitable value. For example, n3 can be about 0 to about 100,000,000, or about 0 to about 100,000, or about 0, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000, 000, 2,000,000, 5,000,000, 10,000,000, 15,000,000, 20,000, 000, 50,000,000, or about 100,000,000 or more.

The variable p1 can have any suitable value. For example, p1 can be about 0 to about 100,000, or about 0, or about 1, 2, 3, 4, 5, 10, 15, 20, 50, 75, 100, 150, 200, 500, 750, 1,000, 1,500, 2,000, 3,000, 4,000, 5,000, 6,000, 7,000, 8,000, 9,000, 10,000, 15,000, 20,000, 50,000, or about 100,000 or more. The variable p2 can have any suitable value. For example, p2 can be about 0 to about 100,000, or about 0, or about 1, 2, 3, 4, 5, 10, 15, 20, 50, 75, 100, 150, 200, 500, 750, 1,000, 1,500, 2,000, 3,000, 4,000, 5,000, 6,000, 7,000, 8,000, 9,000, 10,000, 15,000, 20,000, 50,000, or about 100,000 or more. The sum of p1 and p2 can have any suitable value, for example, about the same as p as defined herein, such as about 1 to about 100,000, or about 1, 2, 3, 4, 5, 10, 15, 20, 50, 75, 100, 150, 200, 500, 750, 1,000, 1,500, 2,000, 3,000, 4,000, 5,000, 6,000, 7,000, 8,000, 9,000, 10,000, 15,000, 20,000, 50,000, or about 100,000 or more.

Poly(alkenylamide).

The poly(alkenylamide)-polysaccharide hydrogel includes a reaction product of the poly(alkenylamide) and the polysaccharide. For example, the poly(alkenylamide)-polysaccharide hydrogel includes a reaction product of a crosslinking reaction between the poly(alkenylamide) and the polysaccharide. The poly(alkenylamide) can be any suitable poly(alkenylamide), such that the composition including the poly(alkenylamide)-polysaccharide hydrogel can be used as described herein.

In some examples, the poly(alkenylamide) can be a reaction product, such as a polymerization reaction product (e.g., free-radical polymerization), of an alkenylamide having the structure

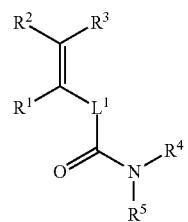

Each of $R^1$, $R^2$, $R^3$, $R^4$, and $R^5$ at each occurrence can be independently selected from the group consisting of —H and $C_1$-$C_{10}$ substituted or unsubstituted hydrocarbyl. At each occurrence $L^1$ can be selected from the group consisting of a bond and $C_1$-$C_{10}$ substituted or unsubstituted hydrocarbylene.

In some embodiments, the poly(alkenylamide) includes a reaction product of the monoalkenylamide described herein and an dialkenylamide having the structure

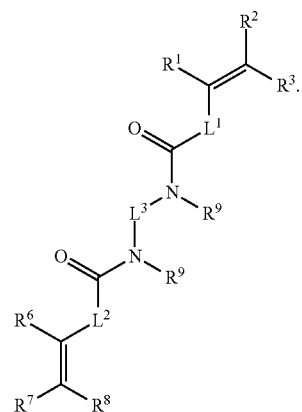

Each of $R^6$, $R^7$, $R^8$, and $R^9$ at each occurrence can be independently selected from the group consisting of —H and $C_1$-$C_{10}$ substituted or unsubstituted hydrocarbyl. Each of $L^2$ and $L^3$ can be independently at each occurrence selected from the group consisting of a bond and $C_1$-$C_{10}$ substituted or unsubstituted hydrocarbylene. In some examples, each of $R^1$, $R^2$, $R^3$, $R^4$, and $R^5$ can be —H. The variable $L^1$ can be a bond. In some examples, each of $R^6$, $R^7$, $R^8$, and $R^9$ can be —H. The variable $L^2$ can be a bond. In some embodiments, the variable $L^3$ can be methylene. In some embodiments, the poly(alkenylamide) can be a poly (acrylamide).

In various embodiments, the poly(alkenylamide) includes the structure -(PAA)$_n$-. The variable PAA can have the structure

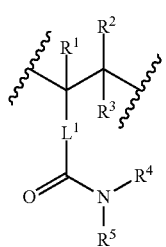

At each occurrence PAA can independently occur in the orientation shown or in the opposite orientation. Each of $R^1$, $R^2$, $R^3$, $R^4$, and $R^5$ at each occurrence can be independently selected from the group consisting of —H and $C_1$-$C_{10}$ substituted or unsubstituted hydrocarbyl. At each occurrence $L^1$ can be selected from the group consisting of a bond and $C_1$-$C_{10}$ substituted or unsubstituted hydrocarbylene. The variable n can be at least about 2. In some embodiments, each of $R^1$, $R^2$, $R^3$, $R^4$, and $R^5$ at each occurrence can be independently selected from the group consisting of —H, methyl, ethyl, and propyl. At each occurrence $L^1$ can be selected from the group consisting of a bond, methylene, ethylene, and propylene. The variable n can be about 2 to about 100,000,000. In some embodiments, each of $R^1$, $R^2$, $R^3$, $R^4$, and $R^5$ can be —H. The variable $L^1$ can be a bond. The variable n can be about 10 to about 100,000.

In some embodiments, poly(alkenylamide) includes the structure $-(PAA)_n-(CL)_m-$. The poly(alkenylamide) can be a block or random copolymer. The variable CL can have the structure

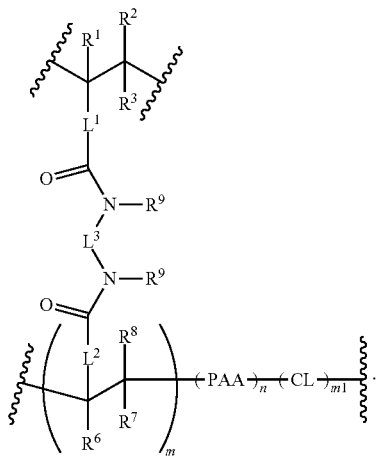

Each of PAA and CL at each occurrence can independently occur in the orientation shown or in the opposite orientation. Each of $R^6$, $R^7$, $R^8$, and $R^9$ at each occurrence can be independently selected from the group consisting of —H and $C_1$-$C_{10}$ substituted or unsubstituted hydrocarbyl. Each of $L^2$ and $L^3$ can be independently at each occurrence selected from the group consisting of a bond and $C_1$-$C_{10}$ substituted or unsubstituted hydrocarbylene. The variable m can be at least about 1. The variable m1 can be about 0 to about 10,000,000. In some embodiments, each of $R^6$, $R^7$, $R^8$, and $R^9$ at each occurrence can be independently selected from the group consisting of —H, methyl, ethyl, and propyl. Each of $L^2$ and $L^3$ can be independently at each occurrence selected from the group consisting of a bond, methylene, ethylene, and propylene. The variable m can be about 1 to about 10,000,000. The variable m1 can be about 0 to about 10,000,000. In some embodiments, each of $R^6$, $R^7$, $R^8$, and $R^9$ can be —H. The variable $L^2$ can be a bond. The variable $L^3$ can be methylene. The variable m can be about 1 to about 10,000. The variable m1 can be about 0 to about 10,000.

In some embodiments, the poly(alkenylamide) can include the structure $-(PAA)_n-(CL)_m-$. The poly(alkenylamide) can be a block or random copolymer. The variable PAA can have the structure

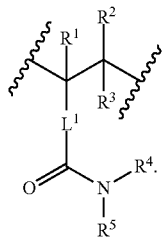

Each of $R^1$, $R^2$, $R^3$, $R^4$, and $R^5$ can be —H. The variable $L^1$ can be a bond. The variable n can be about 10 to about 100,000. The variable CL can have the structure

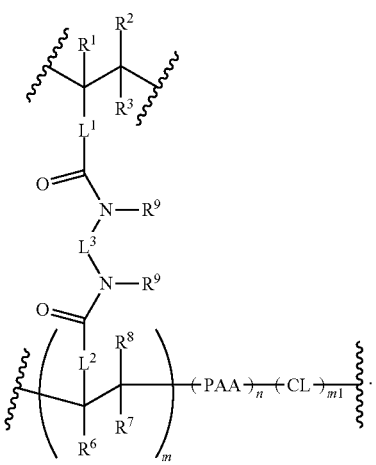

Each of PAA and CL at each occurrence can independently occur in the orientation shown or in the opposite orientation. Each of $R^6$, $R^7$, $R^8$, and $R^9$ can be —H. The variable $L^2$ can be a bond. The variable $L^3$ can be methylene. The variable m can be about 1 to about 10,000. The variable m1 can be about 0 to about 10,000.

In some embodiments, the poly(alkenylamide) can include the structure $-(PAA)_n-(CL)_m-$. The poly(alkenylamide) can be a block or random copolymer. The variable PAA can have the structure

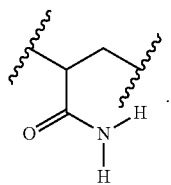 [SMILES: *CC(*)C(N)=O]

The variable n can be about 10 to about 100,000. The variable CL can have the structure

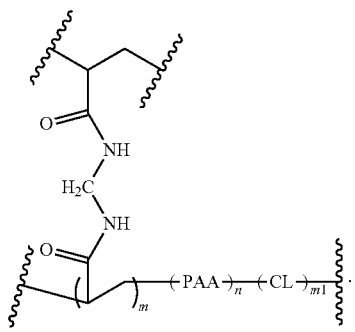

The variable m can be about 1 to about 10,000. The variable m1 can be about 0 to about 10,000.

In various embodiments, the poly(alkenylamide) can have the structure E1-(PAA)$_n$-(CL)$_m$-E1. The variable CL can have the structure

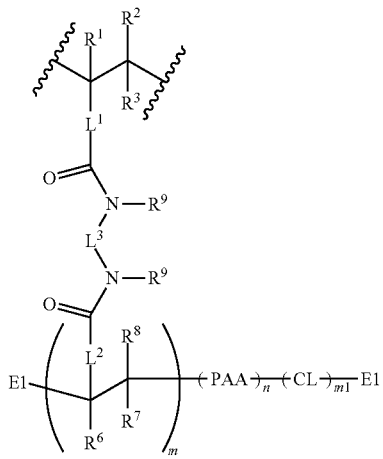

At each occurrence the end group E1 can be independently selected from the group consisting of H, —R', —OH, and —OR' wherein R' at each occurrence is independently substituted or unsubstituted $C_1$-$C_{10}$ hydrocarbyl.

The poly(alkenylamide) can have any suitable molecular weight. For example, the poly(alkenylamide) can have a molecular weight of about 500 g/mol to about 100,000,000 g/mol, or about 1,000 g/mol to about 5,000,000 g/mol, or about 500 g/mol or less, or about 750 g/mol, 1000, 1,500, 2,000, 3,000, 4,000, 5,000, 7,500, 10,000, 15,000, 20,000, 30,000, 40,000, 50,000 75,000, 100,000, 150,000, 200,000, 300,000, 400,000, 500,000, 750,000, 1,000,000, 1,500,000, 2,000,000, 3,000,000, 4,000,000, or about 5,000,000 g/mol or more.

The variable n can have any suitable value. For example, 2 to about 10,000,000, or about 10 to about 10,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000, 000, or about 10,000,000 or more.

The variable m can have any suitable value. For example, m can be about 1 to about 10,000,000, or about 1 to about 10,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, or about 10,000,000 or more.

The variable m1 can have any suitable value. For example, 0 to about 10,000,000, or about 0 to about 10,000, or about 0, 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, or about 10,000,000 or more.

Polysaccharide.

The poly(alkenylamide)-polysaccharide hydrogel includes a reaction product of the poly(alkenylamide) and the polysaccharide. For example, the poly(alkenylamide)-polysaccharide hydrogel includes a reaction product of a crosslinking reaction between the poly(alkenylamide) and the polysaccharide. The polysaccharide can be any suitable polysaccharide, such that the composition including the poly(alkenylamide)-polysaccharide hydrogel can be used as described herein. The polysaccharide can include suitable crosslinks between at least one of a single molecule of polysaccharide and multiple molecules of polysaccharide. The polysaccharide crosslinks can be ionic crosslinks formed by interaction between a cation and carboxyl groups on the polysaccharide. In various embodiments, the cation-carboxyl crosslinks of the polysaccharide can be present before the crosslinking to form the hydrogel. In some embodiments, the cation-carboxyl crosslinks of the polysaccharide can form at least one of during the crosslinking to form the hydrogel and after the crosslinking to form the hydrogel.

In some embodiments, the polysaccharide can be at least one of acetan, alginate, alginic acid, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, and any suitable derivative of any member of the group. The polysaccharide can be at least one of alginate, alginic acid, and a salt of alginic acid.

In various embodiments, the polysaccharide includes Structure I

Structure I

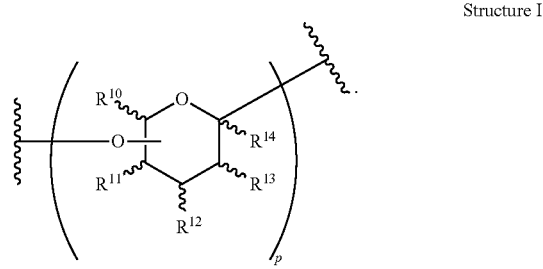

Each of $R^{10}$, $R^{11}$, $R^{12}$, $R^{13}$, and $R^{14}$ can be independently selected from the group consisting of —H, —$R^{15}$, —$OR^{15}$, and —C(O)$R^{16}$. At each occurrence $R^{15}$ can be independently selected from the group consisting of —H and $C_1$-$C_{10}$ substituted or unsubstituted hydrocarbyl. At each occurrence $R^{16}$ can be independently selected from the group consisting of —O⁻, —OH, and —O⁻CI⁺. At each occurrence CI⁺ can be independently a counterion. The variable p can be at least about 2.

In some embodiments, Structure I can be

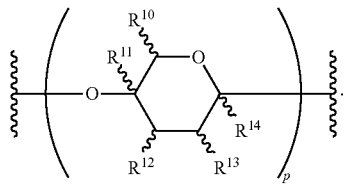

In some embodiments, Structure I can be

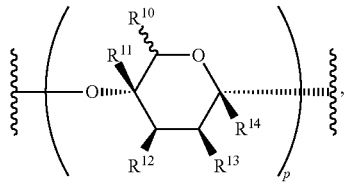

Each of $R^{10}$, $R^{11}$, $R^{12}$, $R^{13}$, and $R^{14}$ can be independently selected from the group consisting of —H, and —OH, wherein $R^{10}$ at each occurrence can be independently —C(O)$R^{16}$. At each occurrence $R^{16}$ can be independently selected from the group consisting of —O⁻, —OH, and —O⁻CI⁺. The variable p can be about 10 to about 100,000.

In various embodiments, Structure I can be

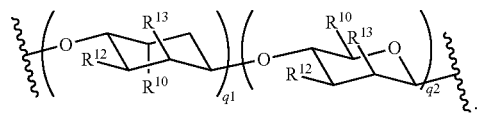

The sum q1+q2 can be about equal to p. In some embodiments, $R^{10}$ can be —C(O)$R^{16}$. At each occurrence $R^{16}$ can be independently selected from the group consisting of —O⁻, —OH, and —O⁻CI⁺. At each occurrence CI⁺ can be independently a counterion. The variables $R^{11}$ and $R^{14}$ can be —H. The variables $R^{12}$ and $R^{13}$ can be —OH. In some embodiments, Structure I can be

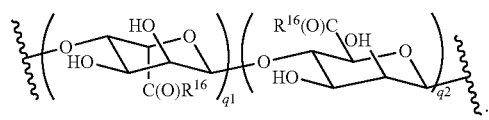

At each occurrence $R^{16}$ can be independently selected from the group consisting of —O⁻, —OH, and —O⁻CI⁺. At each occurrence CI⁺ can be independently a counterion. The sum q1+q2 can be about equal to p.

The variable CI⁺ can be a positively charged counterion, such as any suitable positively charged counterion. For example, the counterion can be sodium (Na⁺), potassium (K⁺), lithium (Li⁺), hydrogen (H⁺), zinc (Zn⁺), or ammonium (NH₄⁺). In some embodiments, the counterion can have a positive charge greater than +1, which can in some embodiments complex to multiple ionized groups, such as $Ca^{2+}$, $Mg^{2+}$, $Zn^{2+}$ or $Al^{3+}$. For example, at each occurrence CI⁺ can be independently selected from the group consisting of Na⁺, K⁺, Li⁺, H⁺, Zn⁺, NH₄⁺ $Ca^{2+}$, $Mg^{2+}$, $Zn^{2+}$ and $Al^{3+}$.

In some embodiments, CI⁺ is $Ca^{2+}$, such that two carboxyl groups from the polysaccharide form an ionic bond with one CI⁺.

In some embodiments, the polysaccharide can have the structure

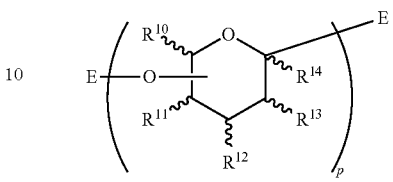

The end cap variable E can be independently at each occurrence selected from the group consisting of H, —R', and —OR'. The variable R' at each occurrence can be independently substituted or unsubstituted $C_1$-$C_{10}$ hydrocarbyl. The variable p can be about 2 to about 100,000,000.

The polysaccharide can have any suitable molecular weight. For example, the polysaccharide can have a molecular weight of about 500 g/mol to about 100,000,000 g/mol, or about 1,000 g/mol to about 5,000,000 g/mol, or about 500 g/mol or less, or about 750 g/mol, 1000, 1,500, 2,000, 3,000, 4,000, 5,000, 7,500, 10,000, 15,000, 20,000, 30,000, 40,000, 50,000 75,000, 100,000, 150,000, 200,000, 300,000, 400,000, 500,000, 750,000, 1,000,000, 1,500,000, 2,000,000, 3,000,000, 4,000,000, or about 5,000,000 g/mol or more.

The variable p can have any suitable value. For example, about 2 to about 100,000,000, or about 2 to about 100,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, 10,000,000, 15,000,000, 20,000,000, 50,000,000, or about 100,000,000 or more.

The variable q1 can have any suitable value. For example, about 0 to about 100,000,000, or about 0 to about 100,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, 10,000,000, 15,000,000, 20,000,000, 50,000,000, or about 100,000,000 or more. The variable q2 can have any suitable value. For example, about 0 to about 100,000,000, or about 0 to about 100,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100,000, 200,000, 500,000, 1,000,000, 2,000,000, 5,000,000, 10,000,000, 15,000,000, 20,000,000, 50,000,000, or about 100,000,000 or more. The sum q1+q2 can be any suitable value, such any value of p as described herein, for example, about 2 to about 100,000,000, or about 2 to about 100,000, or about 1, 2, 3, 4, 5, 10, 15, 20, 50, 75, 100, 150, 200, 500, 750, 1,000, 1,500, 2,000, 5,000, 10,000, 15,000, 20,000, 50,000, 100, 000, 200,000, 500,000, 1,000,000, 2,000,000, 5,000,000, 10,000,000, 15,000,000, 20,000,000, 50,000,000, or about 100,000,000 or more.

Downhole Mixture or Composition.

The composition including a poly(alkenylamide)-polysaccharide hydrogel can be combined with any suitable downhole fluid before, during, or after the placement of the composition in the subterranean formation or the contacting of the composition and the subterranean material. In some examples, the composition including a poly(alkenylamide)-polysaccharide hydrogel is combined with a downhole fluid above the surface, then the combined composition is placed in a subterranean formation or contacted with a subterranean material. In another example, the composition including a poly(alkenylamide)-polysaccharide hydrogel is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In some embodiments, the poly(alkenylamide)-polysaccharide hydrogel can be used in particulate form, such as particulates less than 500 micrometers in size, in combination with drilling fluids. In some embodiments, the particulate hydrogel can be included in the internal phase of an oil-based drilling fluid; in some embodiments, this can help reduce emulsion blockages from forming, for example in a reservoir for the drilling fluid. In some embodiments, the particulate hydrogel can be included as a general fluid loss additive in water-based drilling fluids. In some embodiments, the hydrogel can be dispersed at low concentration to act as a suspension agent by adding viscosity to a composition, which can be useful in drilling fluids, lost circulation pills, sweeps, and the like.

In various embodiments, the method includes combining the composition including a poly(alkenylamide)-polysaccharide hydrogel with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including a poly(alkenylamide)-polysaccharide hydrogel, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resin, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including a poly(alkenylamide)-polysaccharide hydrogel in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R.

Gray, Composition and Properties of Drilling and Completion Fluids 66-67, 561-562 (5$^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including a poly(alkenylamide)-polysaccharide hydrogel can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Drilling Assembly.

The composition including a poly(alkenylamide)-polysaccharide hydrogel described herein may directly or indirectly affect one or more components or pieces of equipment associated with the preparation, delivery, recapture, recycling, reuse, and/or disposal of the disclosed composition including a poly(alkenylamide)-polysaccharide hydrogel. For example, and with reference to FIG. 1, the disclosed composition including a poly(alkenylamide)-polysaccharide hydrogel may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The composition including a poly(alkenylamide)-polysaccharide hydrogel may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, a composition including a poly(alkenylamide)-polysaccharide hydrogel may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the composition including a poly(alkenylamide)-polysaccharide hydrogel may be stored, reconditioned, and/or regulated until added to the drilling fluid 122.

As mentioned above, the composition including a poly(alkenylamide)-polysaccharide hydrogel may directly or indirectly affect the components and equipment of the drilling assembly 100. For example, the composition including a poly(alkenylamide)-polysaccharide hydrogel may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used store, monitor, regulate, and/or recondition the composition including a poly(alkenylamide)-polysaccharide hydrogel.

The composition including a poly(alkenylamide)-polysaccharide hydrogel may directly or indirectly affect the pump 120, which representatively includes any conduits, pipelines, trucks, tubulars, and/or pipes used to fluidically convey the composition including a poly(alkenylamide)-polysaccharide hydrogel downhole, any pumps, compressors, or motors (e.g., topside or downhole) used to drive the composition into motion, any valves or related joints used to regulate the pressure or flow rate of the composition, and any sensors (e.g., pressure, temperature, flow rate, etc.), gauges, and/or combinations thereof, and the like. The composition including a poly(alkenylamide)-polysaccharide hydrogel may also directly or indirectly affect the mixing hopper 134 and the retention pit 132 and their assorted variations.

The composition including a poly(alkenylamide)-polysaccharide hydrogel may also directly or indirectly affect the various downhole equipment and tools that may come into contact with composition including a poly(alkenylamide)-polysaccharide hydrogel such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The composition including a poly(alkenylamide)-polysaccharide hydrogel may also directly or indirectly affect any downhole heat exchangers, valves and corresponding actuation devices, tool seals, packers and other wellbore isolation devices or components, and the like associated with the wellbore 116. The composition including a poly(alkenylamide)-polysaccharide hydrogel may also directly or indirectly affect the drill bit 114, which may include, but is not limited to, roller cone bits, PDC bits, natural diamond bits, any hole openers, reamers, coring bits, etc.

While not specifically illustrated herein, the composition including a poly(alkenylamide)-polysaccharide hydrogel may also directly or indirectly affect any transport or delivery equipment used to convey the composition including a poly(alkenylamide)-polysaccharide hydrogel to the drilling assembly 100 such as, for example, any transport vessels, conduits, pipelines, trucks, tubulars, and/or pipes used to fluidically move the composition including a poly(alkenylamide)-polysaccharide hydrogel from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

Composition for Treatment of a Subterranean Formation.

Various embodiments provide a composition for treatment of a subterranean formation. The composition can be any suitable composition that can be used to perform an embodiment of the method for treatment of a subterranean formation described herein. The composition can include a poly(alkenylamide)-polysaccharide hydrogel, such as any suitable poly(alkenylamide)-polysaccharide hydrogel described herein. In various embodiments, the composition further includes a downhole fluid, such as any suitable downhole fluid described herein. In some embodiments, the composition further includes a drilling fluid or a cementing fluid such as a cement slurry.

For example, the composition for treatment of a subterranean formation can include a poly(alkenylamide)-polysaccharide hydrogel, where the poly(alkenylamide) includes the structure $-(PAA)_n-$. The variable PAA can include the structure

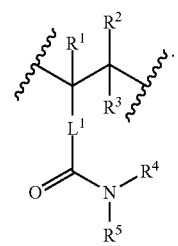

At each occurrence PAA can independently occur in the orientation shown or in the opposite orientation. Each of $R^1$, $R^2$, $R^3$, $R^4$, and $R^5$ at each occurrence can be independently selected from the group consisting of —H and $C_1$-$C_{10}$ substituted or unsubstituted hydrocarbyl. At each occurrence $L^1$ can be selected from the group consisting of a bond and $C_1$-$C_{10}$ substituted or unsubstituted hydrocarbylene. The variable n can be is at least about 2. The polysaccharide can include Structure I

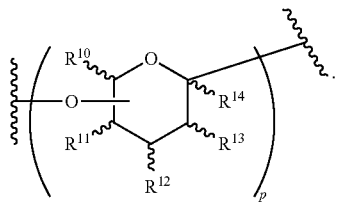

Structure I

Each of $R^{10}$, $R^{11}$, $R^{12}$, $R^{13}$, and $R^{14}$ can be independently selected from the group consisting of —H, —$R^{15}$, —$OR^{15}$, and —C(O)$R^{16}$. At each occurrence $R^{15}$ can be independently selected from the group consisting of —H and $C_1$-$C_{10}$ substituted or unsubstituted hydrocarbyl. At each occurrence $R^{16}$ can be independently selected from the group consisting of —$O^-$, —OH, and —$O^-CI^+$. At each occurrence $CI^+$ can be independently a counterion. The variable p can be at least about 2. The poly(alkenylamide)-polysaccharide hydrogel can include at least one crosslink between the poly(alkenylamide) and the polysaccharide including an imide (e.g., —C(O)—NH—C(O)— or an N—($C_1$-$C_{10}$ substituted or unsubstituted)alkyl variant thereof).

In various embodiments the present invention provides a composition for the treatment of a subterranean formation that includes a poly(alkenylamide)-polysaccharide hydrogel including the structure -(PAA)$_{n1}$-(CL)$_{n2}$-(PAA-PS)$_{n3}$-. The variables PAA, CL, PAA-PS, and the repeating units of PAA, CL, and PAA-PS, can be in a block copolymer or random copolymer arrangement. The variable PAA can have the structure

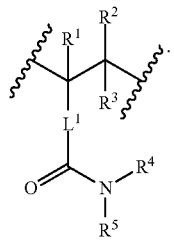

The variable CL can have the structure

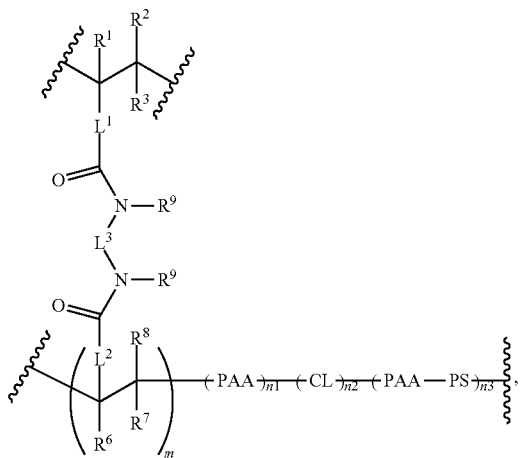

At each occurrence PAA-PS can be part of the same polysaccharide or a different polysaccharide. The variable PAA-PS can have the structure

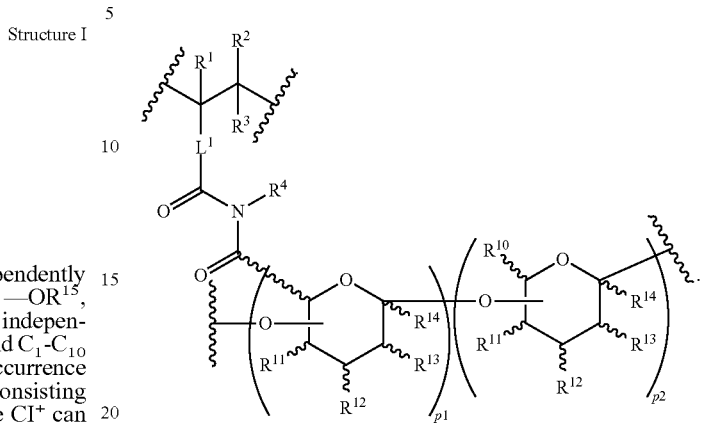

At each occurrence each of PAA, CL, and PAA-PS can independently occur in the orientation shown or in the opposite orientation. Each of $R^1$, $R^2$, $R^3$, $R^4$, and $R^5$ at each occurrence can be independently selected from the group consisting of —H and $C_1$-$C_{10}$ substituted or unsubstituted hydrocarbyl. Each of $L^1$, $L^2$, and $L^3$ at each occurrence can be selected from the group consisting of a bond and $C_1$-$C_{10}$ substituted or unsubstituted hydrocarbylene. Each of $R^{10}$, $R^{11}$, $R^{12}$, $R^{13}$, and $R^{14}$ can be independently selected from the group consisting of —H, —$R^{15}$, —$OR^{15}$, and —C(O)$R^{16}$. At each occurrence $R^{15}$ can be independently selected from the group consisting of —H and $C_1$-$C_{10}$ substituted or unsubstituted hydrocarbyl. At each occurrence $R^{16}$ can be independently selected from the group consisting of —$O^-$, —OH, and —$O^-CI^+$. At each occurrence $CI^+$ can be independently a counterion. The sum n1+n3 can be at least about 2, n2 is about 0 to about 100,000,000, and p1+p2 is at least about 2.

In various embodiments the present invention provides a composition for treatment of a subterranean formation, where the composition includes a poly(alkenylamide)-polysaccharide hydrogel, where the poly(alkenylamide) can include the structure -(PAA)$_n$-(CL)$_m$-. The poly(alkenylamide) can be a block or random copolymer. The variable PAA can have the structure

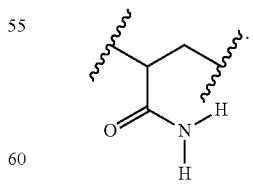

The variable n can be about 10 to about 100,000. The variable CL can have the structure

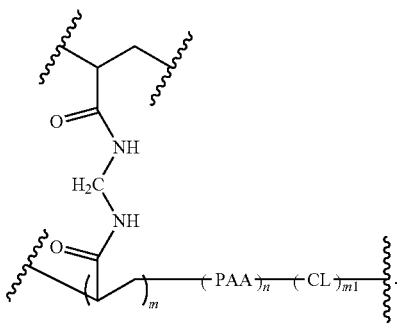

The variable m can be about 1 to about 10,000. The variable m1 can be about 0 to about 10,000. The polysaccharide can include Structure I

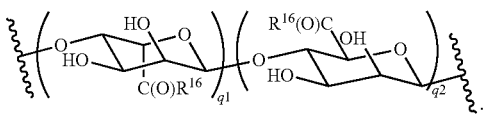

At each occurrence $R^{16}$ can be independently selected from the group consisting of —O$^-$, —OH, and —O$^-$CI$^+$. At each occurrence CI$^+$ can be independently a counterion. The sum q1+q2 can be about 10 to about 100,000. The poly(alkenylamide)-polysaccharide hydrogel can include at least one crosslink between the poly(alkenylamide) and the polysaccharide including an imide (e.g., —C(O)—NH—C(O)— or an N—(C$_1$-C$_{10}$ substituted or unsubstituted)alkyl variant thereof).

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a poly(alkenylamide)-polysaccharide hydrogel, such as any poly(alkenylamide)-polysaccharide hydrogel described herein. The method can include combining a suitable poly(alkenylamide) and a suitable polysaccharide to provide a mixture, and crosslinking the mixture. In some examples, the crosslinking can be performed by application of light, such as light including UV light. The poly(alkenylamide) can be provided by any suitable method, such as by free-radical polymerization of a suitable alkenylamide. The polysaccharide can be provided by any suitable method, such as by derivation from a natural source, or by synthesis.

EXAMPLES

The present invention can be better understood by reference to the following examples which are offered by way of illustration. The present invention is not limited to the examples given herein.

The below Examples appear in Sun, Jeong-Yun et. al., *Nature* 2012, 489, 133-136.

General: The alginate used was FMC Biopolymer, LF 20/40; The acrylamide used was Sigma, A8887; the ammonium persulphate used was Sigma, A9164; the methylenebisacrylamide (MBAA) used was Sigma, M7279; the N,N,N',N'-tetramethylethylenediamine used was Sigma, T7024; the CaSO$_4$.2H$_2$O used was Sigma, 31221; the ultraviolet lamp used was Hoefer, UVC 500.

Determination of fracture energy: Two samples of the same gel were pulled separately. One sample was unnotched, and the other sample was notched. In the initial state when the gel was undeformed, each sample was of width $a_0$=75 mm and thickness $b_0$=3 mm, and the distance between the two clamps was $L_0$=5 mm. The unnotched sample was pulled to measure the force-length curve. To determine the fracture energy, it was unnecessary to pull the unnotched sample all the way to rupture. When the two clamps were pulled to a distance L, the area beneath the force-length curve gave the work done by the applied force, U(L). The notched sample was prepared by using a razor blade to cut into the gel a 40 mm-long notch. (The precise length of the notch was unimportant for this test.) The notched sample was pulled, and pictures were taken at a rate of ~30 frames/sec to record the critical distance between the clamps, $L_c$, when the notch turned into a running crack. The fracture energy was calculated from $$\Gamma = \frac{U(L_c)}{a_o b_o}.$$

Example 1

Synthesis of Alginate-Polyacrylamide Gel

Figure 2:
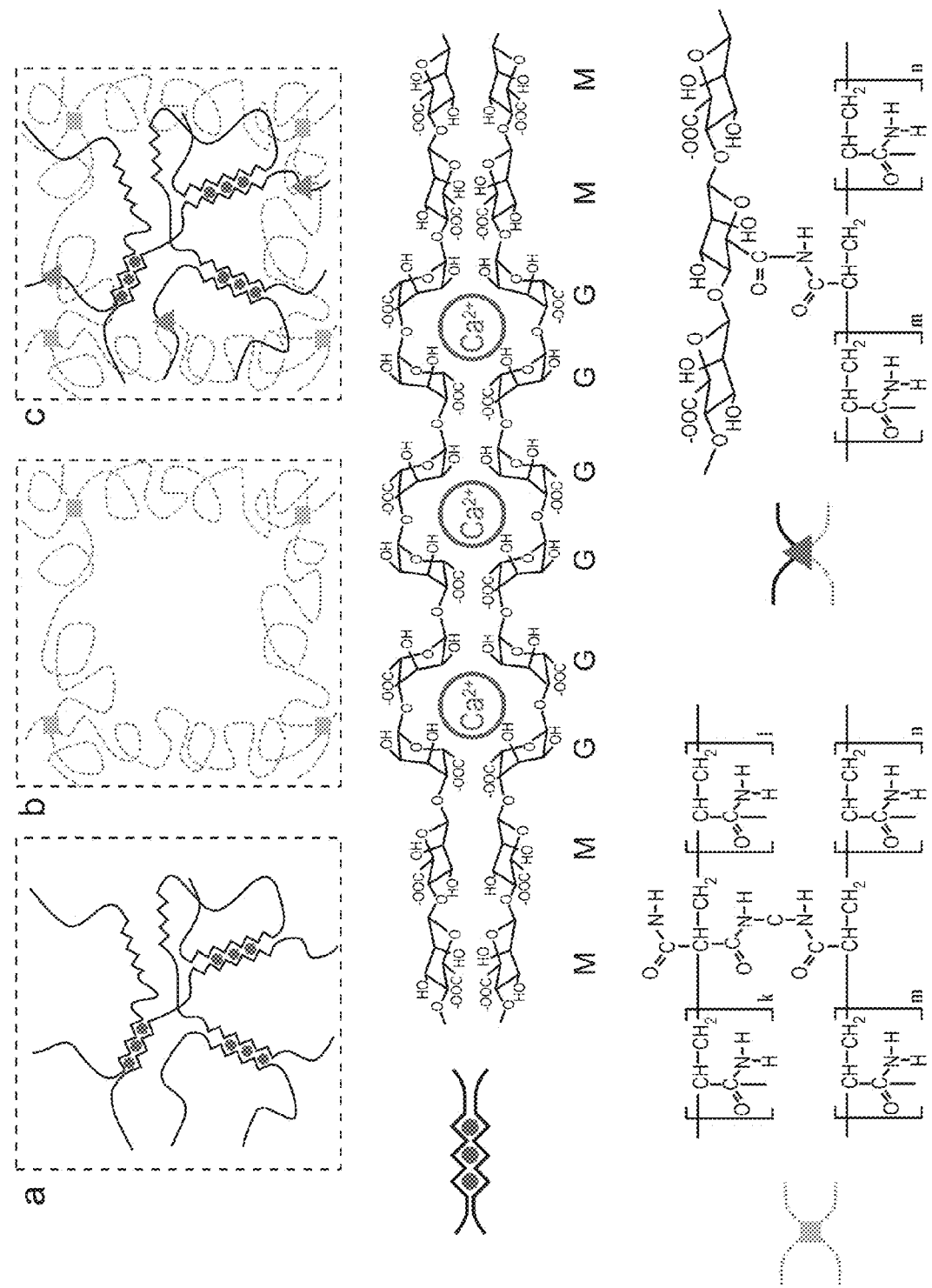
FIG. 2 and insets a-c illustrate schematics of alginate, polyacrylamide, and alginate-polyacrylamide hydrogels, in accordance with various embodiments.

Extremely stretchable and tough hydrogels were synthesized by mixing two types of crosslinked polymer: ionically crosslinked alginate, and covalently crosslinked polyacrylamide (FIG. 2).

FIG. 2 and insets a-c illustrate schematics of alginate, polyacrylamide, and alginate-polyacrylamide hydrogels. FIG. 2 inset a illustrates an alginate gel, wherein the G blocks on different polymer chains form ionic crosslinks through Ca$^{2+}$. FIG. 2 inset b illustrates a polyacrylamide gel, the polymer chains form covalent crosslinks through N,N-methylenebisacrylamide (MBAA). FIG. 2 inset c illustrates an alginate-polyacrylamide gel, wherein the two types of polymer network are intertwined, and joined by covalent crosslinks between amine groups on polyacrylamide chains and carboxyl groups on alginate chains.

An alginate chain includes mannuronic acid (M unit) and guluronic acid (G unit), arranged in blocks rich in G units, blocks rich in M units, and blocks of alternating G and M units. In an aqueous solution, the G blocks in different alginate chains form ionic crosslinks through divalent cations (for example, Ca$^{2+}$), resulting in a network in water—an alginate hydrogel. By contrast, in a polyacrylamide hydrogel, the polyacrylamide chains form a network by covalent crosslinks. Powders of alginate and acrylamide were dissolved in deionized water. (Unless otherwise stated, in the Examples the water content was fixed at 86 wt %.) Ammonium persulphate was added as a photo-initiator for polyacrylamide, and N,N-methylenebisacrylamide was used as the crosslinker for polyacrylamide. After degassing the solution in a vacuum chamber, N,N,N',N'-tetramethylethylenediamine was added, at 0.0025 the weight of acrylamide, as the crosslinking accelerator for polyacrylamide, and calcium sulphate slurry (CaSO$_4$.2H$_2$O) as the ionic crosslinker for alginate. The solution was poured into a glass mould measuring 75.0×150.0×3.0 mm$^3$, covered with a 3-mm-thick glass plate. The gel was cured with ultraviolet light for 1 hour (with 8 W power and 254 nm wavelength at 50° C.), and was then left in a humid box for 1 day to stabilize the reactions. After the curing step, the gel was taken out of the humid box, and water on its surfaces was removed using $N_2$ gas for 1 minute.

Example 2

Mechanical Testing of Alginate-Polyacrylamide Gel

The gel was glued to two polystyrene clamps, resulting in specimens measuring 75.0×5.0×3.0 mm³. All mechanical tests were performed in air, at room temperature, using a tensile machine with a 500-N load cell. In both loading and unloading, the rate of stretch was kept constant at 2 min⁻¹.

FIG. 3 illustrates that the alginate-polyacrylamide gel was highly stretchable and notch-insensitive. FIG. 3a illustrates a strip of the undeformed alginate-poltyacrylamide gel glued to two rigid clamps. FIG. 3b illustrates an alginate-polty-acrylamide gel stretched to 21 times its initial length in a tensile machine (Instron model 3342). The stretch, λ, was defined by the distance between the two clamps when the gel was deformed, divided by the distance when the gel is undeformed. FIG. 3c illustrates an alginate-poltyacrylamide gel having a notch cut into the gel, using a razor blade; a small stretch of 1.15 was used to make the notch clearly visible. FIG. 3d illustrates the gel containing the notch stretched to 17 times its initial length. The alginate/acrylamide ratio was 1:8. The weight of the covalent crosslinker, MBAA, was fixed at 0.0006 that of acrylamide; the weight of the ionic crosslinker, $CaSO_4$, was fixed at 0.1328 that of alginate.

Figure 3A:
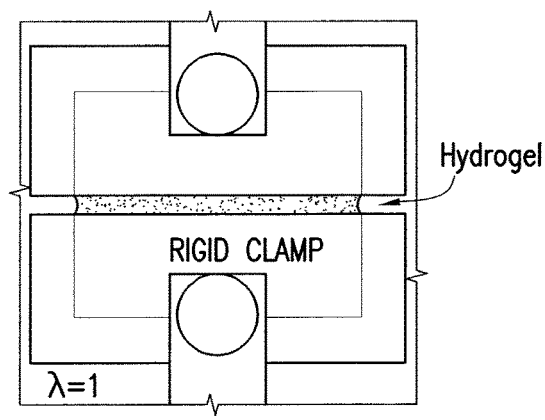
FIG. 3a illustrates a strip of undeformed alginate-poltyacrylamide gel glued to two rigid clamps, in accordance with various embodiments.
Figure 3C:
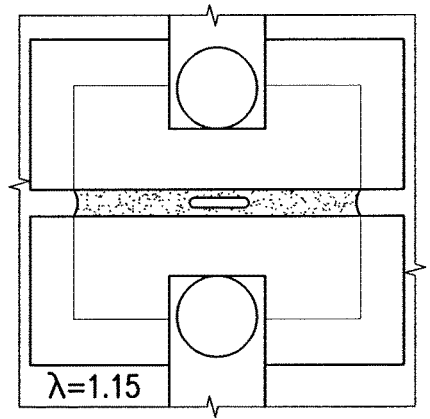
FIG. 3c illustrates an alginate-poltyacrylamide gel having a notch cut into the gel, in accordance with various embodiments.
Figure 3B:
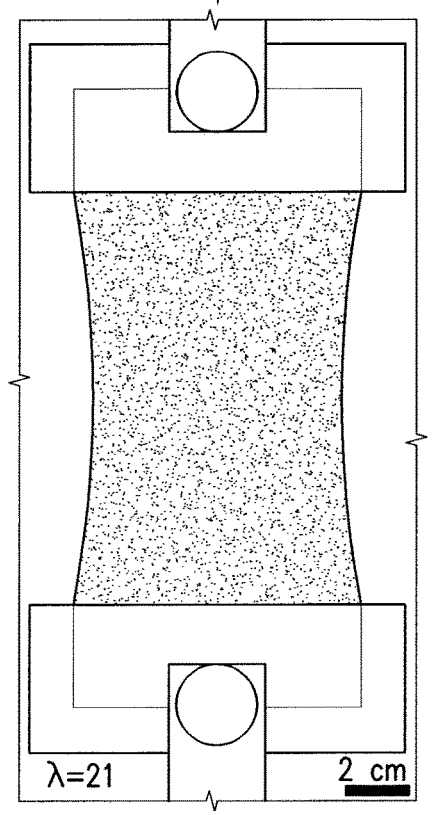
FIG. 3b illustrates an alginate-poltyacrylamide gel stretched to 21 times its initial length, in accordance with various embodiments.
Figure 3D:
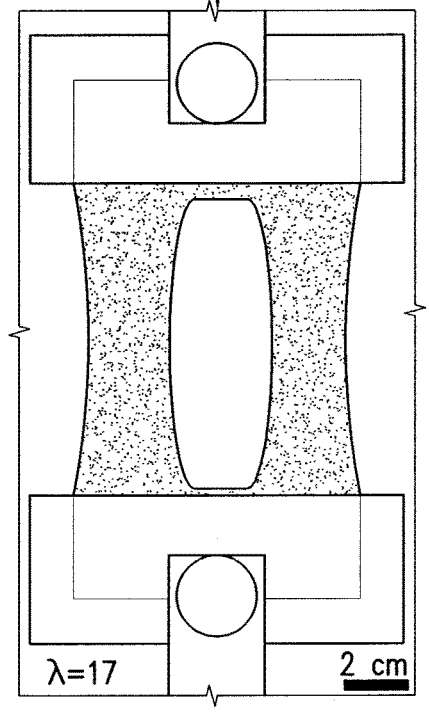
FIG. 3d illustrates the gel containing the notch stretched to 17 times its initial length, in accordance with various embodiments.

The alginate-polyacrylamide gel was stretched to 20 times its original length without rupture (FIG. 3a,b). The alginate-polyacrylamide gel was also extremely notch-insensitive. When a notch was cut into the gel (FIG. 3c) and then the gel was pulled to a stretch of 17, the notch was dramatically blunted and remained stable (FIG. 3d). At a critical applied stretch, a crack initiated at the front of the notch, and ran rapidly through the entire sample. Large, recoverable deformation was demonstrated by dropping a metal ball on a membrane of the gel fixed by circular clamps. On hitting the membrane, the ball stretched the membrane greatly and then bounced back. The membrane remained intact, vibrated, and recovered its initial flat configuration after the vibration was damped out. A ball with greater kinetic energy, however, caused the membrane to rupture after large deformation.

Example 3

Mechanical Testing of Alginate, Polyacrylamide, and Alginate-Polyacrylamide Gels The properties of the alginate-polyacrylamide were even more remarkable when compared with gels formed from the individual alginate and polyacrylamide gels (FIG. 4a). The amounts of alginate and acrylamide in the alginate-acrylamide gels were kept the same as those in the alginate gel and polyacrylamide gel, respectively. When the stretch was small, the elastic modulus of the alginate-acrylamide gel was 29 kPa, which is close to the sum of the elastic moduli of the alginate and polyacrylamide gels (17 kPa and 8 kPa, respectively). The stress and stretch at rupture were, respectively, 156 kPa and 23 for the alginate-acrylamide gel, 3.7 kPa and 1.2 for the alginate gel, and 11 kPa and 6.6 for the polyacrylamide gel. Thus, the properties at rupture of the alginate-acrylamide gel far exceeded those formed from either of its alginate and polyacrylamide components.

The alginate-polyacrylamide gels dissipated energy effectively, as shown by pronounced hysteresis. The area between the loading and unloading curves of a gel gives the energy dissipated per unit volume (FIG. 4b). The alginate gel exhibited pronounced hysteresis and retained significant permanent deformation after unloading. In contrast, the polyacrylamide gel showed negligible hysteresis, and the sample fully recovered its original length after unloading. The alginate-polyacrylamide gel also showed pronounced hysteresis, but the permanent deformation after unloading was significantly smaller than that of the alginate gel. The pronounced hysteresis and relatively small permanent deformation of the alginate-acrylamide gel were further demonstrated by loading several samples to large values of stretch before unloading (FIG. 4c).

After the first loading and unloading, the alginate-acrylamide gel was weaker if the second loading was applied immediately, and at least partially recovered if the second loading was applied 1 day later (FIG. 4d). A sample of the alginate-acrylamide gel was loaded to a stretch of 7, and then unloaded the gel to zero force. The sample was then sealed in a polyethylene bag and submerged in mineral oil to prevent water from evaporating, and stored in a fixed-temperature bath for a prescribed time. The sample was then taken out of storage and its stress-stretch curve was measured again at room temperature. The internal damage was much better healed by storing the gel at an elevated temperature for some time before reloading (FIG. 4e). After storing at 80° C. for 1 day, the work on reloading was recovered to 74% of that of the first loading (FIG. 4f).

Figure 4:
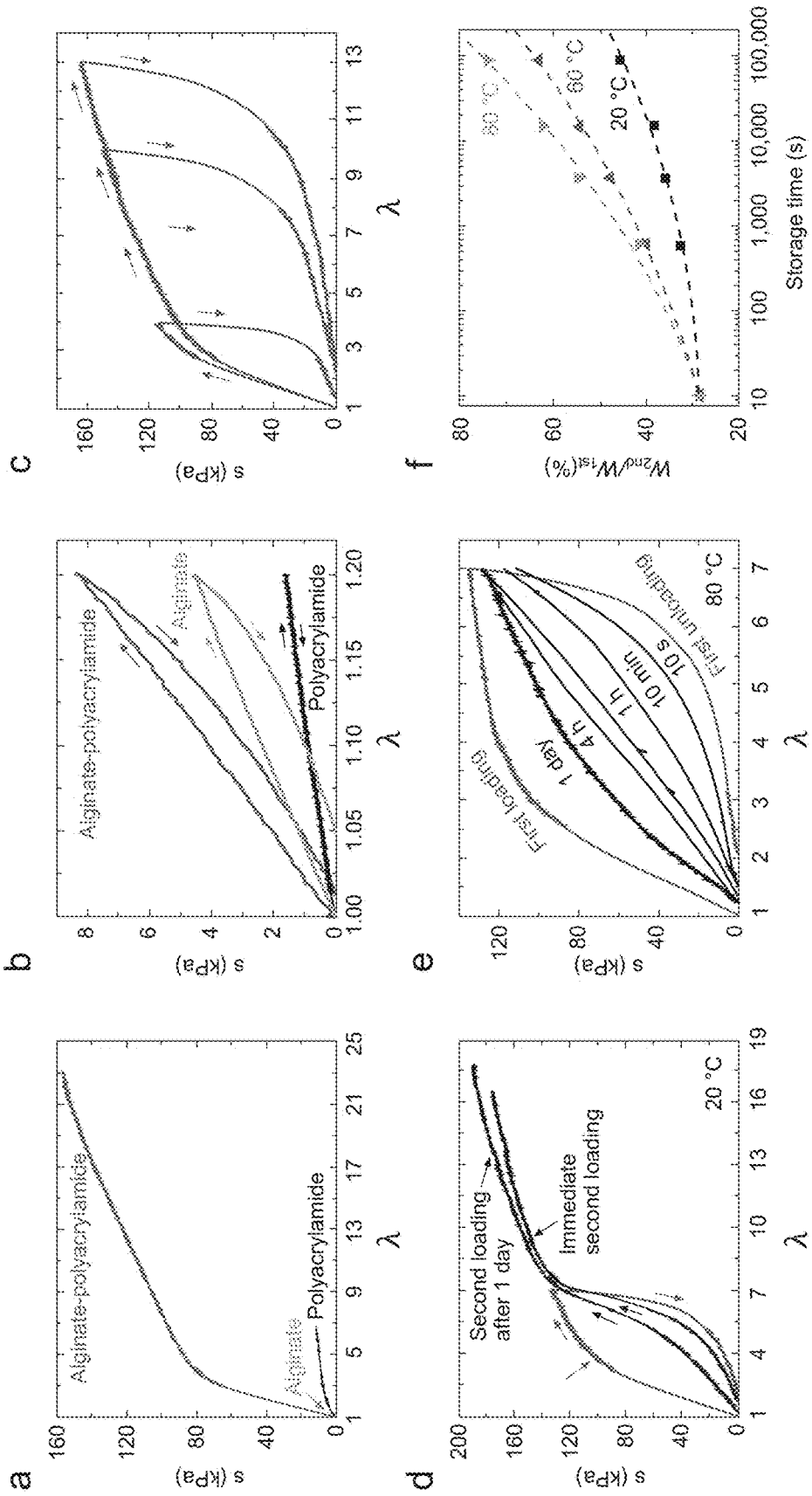
FIG. 4a illustrates stress-stretch curves of alginate, polyacrylamide, and alginate-polyacrylamide gels, with each stretched to rupture, in accordance with various embodiments.
FIG. 4b illustrates stress-stretch curve of alginate, polyacrylamide, and alginate-polyacrylamide gels each loaded to a stretch of 1.2, in accordance with various embodiments.
FIG. 4c illustrates stress-stretch curve of samples of the alginate-polyacrylamide gel subjected to a cycle of loading and unloading of varying maximum stretch, in accordance with various embodiments.
FIG. 4d illustrates stress-stretch curves of the gels herein after the first cycle of loading and unloading (outer curves), with one sample reloaded immediately, and the other sample reloaded after 1 day (inner curves, as labeled), in accordance with various embodiments.
FIG. 4e illustrates stress-stretch curves showing recovery of samples stored at 80° C. for different durations, as labeled, in accordance with various embodiments.
FIG. 4f illustrates the work of the second loading, W$_{2nd}$, normalized by that of the first loading, W$_{1st}$, measured for samples stored for different durations at different temperatures, in accordance with various embodiments.

FIG. 4 illustrates mechanical tests of alginate, polyacrylamide, and alginate-polyacrylamide gels under various conditions. FIG. 4a illustrates stress-stretch curves of three types of gel, with each stretched to rupture. The nominal stress, s, is defined as the force applied on the deformed gel, divided by the cross sectional area of the undeformed gel. FIG. 4b illustrates stress-stretch curve of the gels each loaded to a stretch of 1.2, just below the value that would rupture the alginate gel, and were then unloaded. FIG. 4c illustrates stress-stretch curve of samples of the alginate-acrylamide gel subjected to a cycle of loading and unloading of varying maximum stretch. FIG. 4d illustrates stress-stretch curves of the gels herein after the first cycle of loading and unloading (outer curves), one sample was reloaded immediately, and the other sample was reloaded after 1 day (inner curves, as labeled). FIG. 4e illustrates stress-stretch curves showing recovery of samples stored at 80° C. for different durations, as labeled. FIG. 4f illustrates the work of the second loading, $W_{2nd}$, normalized by that of the first loading, $W_{1st}$, measured for samples stored for different durations at different temperatures. The alginate/acrylamide ratio was 1:8 for FIGS. 4a and b, and 1:6 for FIGS. 4c-f. The weights of crosslinkers were fixed as described in herein for FIG. 3.

Example 4

Mechanical Testing of Alginate-Polyacrylamide Gels

Example 4a

Proportion of Alginate to Acrylamide

Gels were prepared containing various proportions of alginate and acrylamide. When the proportion of acrylamide was increased, the elastic modulus of the alginate-acrylamide gel decreased (FIG. 5a). However, the critical stretch at rupture reached a maximum at 89 wt % acrylamide. A similar trend was observed for samples with notches (FIG. 5c). The fracture energy reached a maximum value of 8,700 J·m$^{-2}$ at 86 wt % acrylamide (FIG. 5d).

Figure 5:
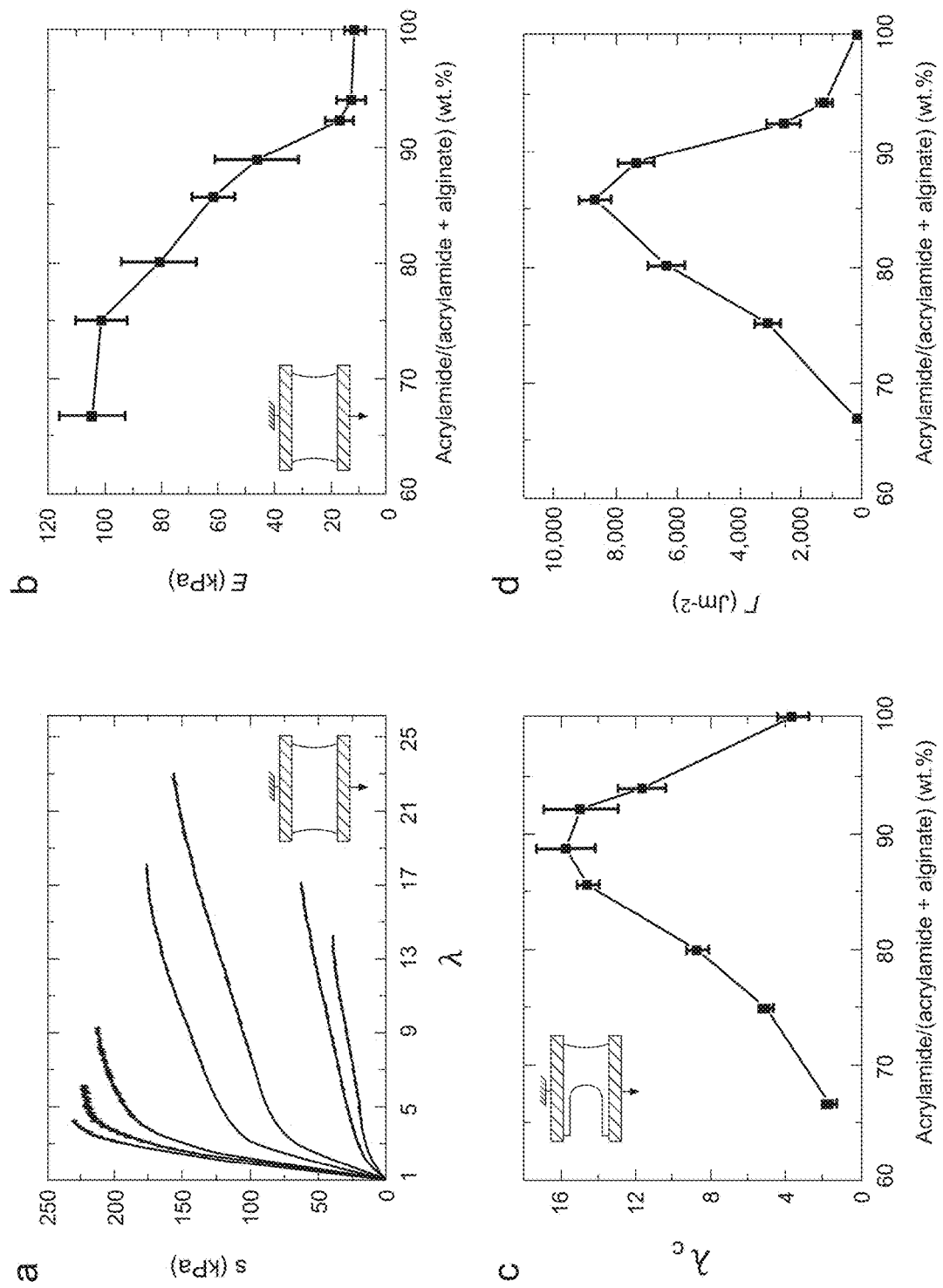
FIG. 5a illustrates stress-strain curves of alginate-polyacrylamide gels of various weight ratios of acrylamide to (acrylamide plus alginate), as labeled, in accordance with various embodiments.
FIG. 5b illustrates elastic moduli calculated from stress-strain curves of alginate-polyacrylamide gel, plotted against weight ratio of acrylamide to (acrylamide plus alginate), in accordance with various embodiments.
FIG. 5c illustrates critical stretch, $\lambda_c$, for notched alginate-polyacrylamide gels of various weight ratios of acrylamide to (acrylamide plus alginate), measured by pulling the gels to rupture, in accordance with various embodiments.
FIG. 5d illustrates fracture energy of alginate-polyacrylamide gels, Γ, as a function of weight ratio of acrylamide to (acrylamide plus alginate), in accordance with various embodiments.

FIG. 5 illustrates the effect of composition on the behaviour of the alginate-polyacrylamide gel. FIG. 5a illustrates stress-strain curves of alginate-polyacrylamide gels of various weight ratios of acrylamide to (acrylamide plus alginate), as labelled. Each test was conducted by pulling an unnotched sample to rupture. FIG. 5b illustrates elastic moduli calculated from stress-strain curves of alginate-polyacrylamide gel, plotted against weight ratio of acrylamide to (acrylamide plus alginate). FIG. 5c illustrates critical stretch, $\lambda_c$, for notched alginate-polyacrylamide gels of various weight ratios of acrylamide to (acrylamide plus alginate), measured by pulling the gels to rupture. FIG. 5d illustrates fracture energy of alginate-polyacrylamide gels, F, as a function of weight ratio of acrylamide to (acrylamide plus alginate). Weights of crosslinkers were fixed as described herein for FIG. 3. Error bars show standard deviation; sample size n=4.

Example 4b

Figure 6:
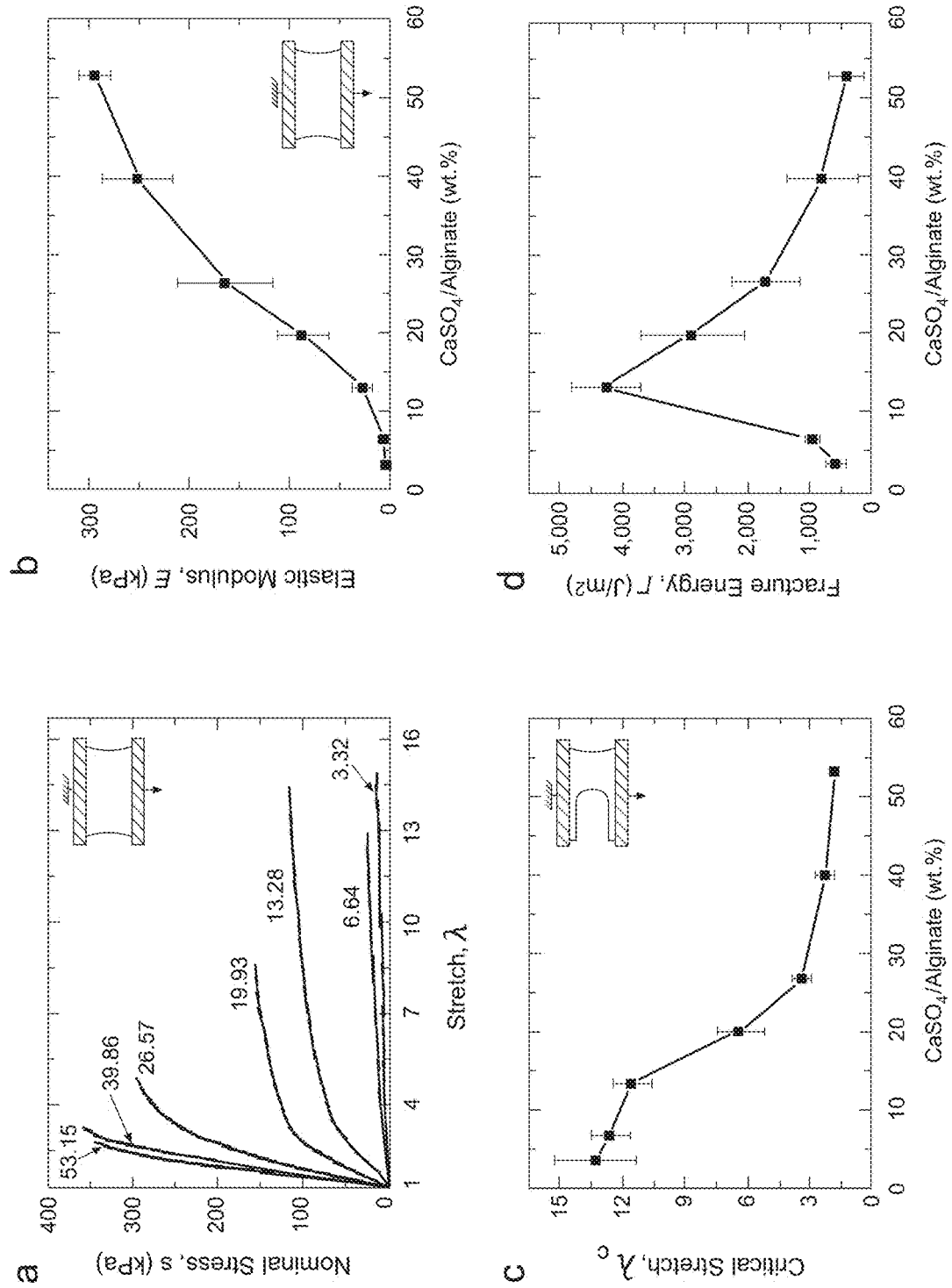
FIG. 6a illustrates stress-strain curves measured using unnotched samples of alginate-polyacrylate gels of various amounts of $CaSO_4$, in accordance with various embodiments.
FIG. 6b illustrates elastic moduli determined by the initial slopes of the stress-strain curves of FIG. 6a, in accordance with various embodiments.
FIG. 6c illustrates critical stretches measured using notched samples of gels, in accordance with various embodiments.
FIG. 6d illustrates variation of fracture energy with respect to the amount of $CaSO_4$ crosslinker, in accordance with various embodiments.

Effect of the Ionic Crosslink Density of Alginate in Alginate-Polyacrylamide Gels To study the effect of the ionic crosslinks between alginate chains, alginate-acrylamide gels with various concentrations of $CaSO_4$ were prepared (FIG. 6). For the unnotched samples, the stress needed to deform the gel increased with the concentration of $CaSO_4$. The small-strain elastic modulus increased with the concentration of $CaSO_4$. For the notched samples, however, the critical stretch for the notch to turn into a running crack decreased as the concentration of $CaSO_4$ increased. The highest fracture energy was obtained for an intermediate concentration of $CaSO_4$.

FIG. 6 illustrates that the amount of ionic crosslinker $CaSO_4$ can affects the behavior of the alginate-acrylamide gel. FIG. 6a illustrates stress-strain curves measured using unnotched samples of alginate-polyacrylate gels of various amounts of $CaSO_4$. FIG. 6b illustrates elastic moduli determined by the initial slopes of the stress-strain curves of FIG. 6a. FIG. 6c illustrates critical stretches measured using notched samples of gels. FIG. 6d illustrates variation of fracture energy with respect to the amount of $CaSO_4$ crosslinker. The weight ratio of alginate to acrylamide was fixed at 1:10, and the water content was fixed at 86 wt %. The covalent crosslinker, MBAA, was fixed at 0.0006 the weight of acrylamide. (Error bars, S.D.; n=3).

Example 4c

Figure 7:
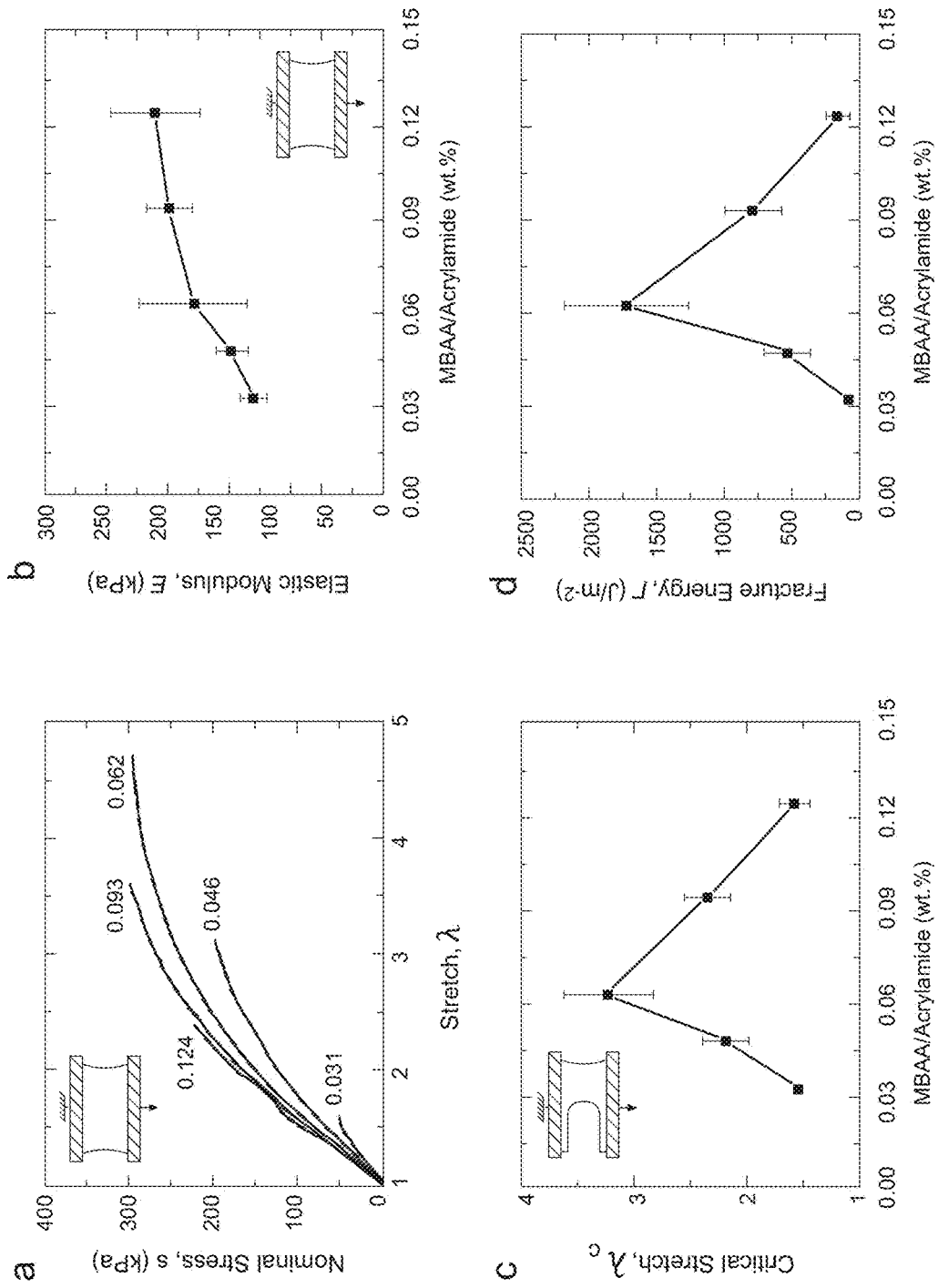
FIG. 7a illustrates stress-strain curves measured using unnotched samples of gels of various amounts of MBAA, in accordance with various embodiments.
FIG. 7b illustrates elastic moduli determined from the initial slopes of the stress-strain curves of FIG. 7a, in accordance with various embodiments.
FIG. 7c illustrates critical stretches were measured using notched samples of gels, in accordance with various embodiments.
FIG. 7d illustrates fracture energy varying with the concentration of the covalent crosslinker, in accordance with various embodiments.

Effect of the Covalent Crosslink Density of Polyacrylamide in Alginate-Polyacrylamide Gels To study the effect of the covalent crosslinks of polyacrylamide, alginate-acrylamide gels were prepared with various concentrations of the crosslinker MBAA. Properties of these gels are shown in FIG. 7. As the concentration of MBAA increased, the crosslink density of the polyacrylamide network increased. However, the stiffness of the alginate-acrylamide gel increased only slightly. The concentration of MBAA did greatly affect the critical stretches of the notched samples. The highest fracture energy was obtained for an intermediate concentration of MBAA.

FIG. 7 illustrates that the amount of covalent crosslinker, MBAA, can affect the behavior of the alginate-acrylamide gel. FIG. 7a illustrates stress-strain curves measured using unnotched samples of gels of various amounts of MBAA. FIG. 7b illustrates elastic moduli determined from the initial slopes of the stress-strain curves of FIG. 7a. FIG. 7c illustrates critical stretches were measured using notched samples of gels. FIG. 7d illustrates fracture energy varying with the concentration of the covalent crosslinker. The weight ratio of alginate to acrylamide was fixed at 1:10, and the water content was fixed at 86 wt %. The ionic crosslinker, $CaSO_4$, was fixed at 0.1328 the weight of alginate. (Error bars, S.D.; n=3).

The Examples demonstrate crosslinking of alginate and polyacrylamide to give ionically and covalently crosslinked hydrogels. In some examples, such gels can be stretched beyond 20 times their initial length, and can have fracture energies of 9,000 J·m$^{-2}$. Even for samples containing notches, a stretch of 17 time the original length was demonstrated. The fracture energy of various embodiments of the alginate-polyacrylamide gel is much larger than previously reported values for tough synthetic gels (100-1,000 J·m$^{-2}$). The giant fracture energy of various embodiments of the alginate-acrylamide gel is remarkable, considering that gels made from the individual components of the gel, e.g., an alginate gel or a polyacrylamide gel, generally have fracture energies of 10-250 J·m$^{-2}$. Various experiments showed that the measured fracture energy can be independent of the shape and size of the specimens.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising a poly(alkenylamide)-polysaccharide hydrogel; and placing the composition in a subterranean formation.

Embodiment 2 provides the method of Embodiment 1, wherein the obtaining or providing of the composition occurs above the surface.

Embodiment 3 provides the method of any one of Embodiments 1-2, wherein the poly(alkenylamide) and the polysaccharide are crosslinked at least partially above the surface to provide the composition comprising the hydrogel.

Embodiment 4 provides the method of any one of Embodiments 1-3, wherein the obtaining or providing of the composition occurs downhole.

Embodiment 5 provides the method of any one of Embodiments 1-4, wherein the poly(alkenylamide) and the polysaccharide are crosslinked at least partially downhole to provide the composition comprising the hydrogel.

Embodiment 6 provides the method of any one of Embodiments 1-5, wherein the hydrogel is substantially hydrated.

Embodiment 7 provides the method of Embodiment 6, wherein the hydrated hydrogel has a fracture energy of about 10 $J \cdot m^{-2}$ to about 30,000 $J \cdot m^{-2}$.

Embodiment 8 provides the method of any one of Embodiments 6-7, wherein the hydrated hydrogel has a fracture energy of about 250 $J \cdot m^{-2}$ to about 12,000 $J \cdot m^{-2}$.

Embodiment 9 provides the method of any one of Embodiments 6-8, wherein the hydrated hydrogel is sufficient to stretch to about 10 to 100 times an original length before breaking.

Embodiment 10 provides the method of any one of Embodiments 6-9, wherein the hydrated hydrogel is sufficient to stretch to about 15 to about 30 times an original length before breaking.

Embodiment 11 provides the method of any one of Embodiments 1-10, wherein the hydrogel comprises about 5 wt % to about 99.999 wt % water.

Embodiment 12 provides the method of any one of Embodiments 1-11, wherein the hydrogel comprises about 50 wt % to about 99.9 wt % water.

Embodiment 13 provides the method of any one of Embodiments 1-12, wherein the hydrogel is substantially dehydrated.

Embodiment 14 provides the method of any one of Embodiments 1-13, wherein the hydrogel comprises about 0.000,000,1 wt % water to about 80 wt % water.

Embodiment 15 provides the method of any one of Embodiments 1-14, wherein the hydrogel comprises about 0.000,000,1 wt % water to about 30 wt % water.

Embodiment 16 provides the method of any one of Embodiments 1-15, wherein the hydrogel comprises hydrogel particles.

Embodiment 17 provides the method of any one of Embodiments 1-16, wherein the hydrogel particles have a size of about 0.001 mm to about 1000 mm.

Embodiment 18 provides the method of any one of Embodiments 1-17, wherein the hydrogel particles have a size of about 0.01 mm to about 500 mm.

Embodiment 19 provides the method of any one of Embodiments 1-18, wherein the composition comprising the hydrogel has a viscosity of about 0.01 cP to about 100,000 cP.

Embodiment 20 provides the method of any one of Embodiments 1-19, wherein the composition comprising the hydrogel has a viscosity of 0.01 cP to about 10,000 cP.

Embodiment 21 provides the method of any one of Embodiments 1-20, further comprising at least partially hydrating the hydrogel, to provide a composition comprising a hydrated hydrogel.

Embodiment 22 provides the method of Embodiment 21, wherein the hydrating comprises the hydrogel taking up an aqueous composition such that about 1 wt % to about 100,000 wt % of the original weight of the hydrogel is absorbed.

Embodiment 23 provides the method of any one of Embodiments 21-22, wherein the hydrating comprises the hydrogel taking up an aqueous composition such that about 20 wt % to about 2,000 wt % of the original weight of the hydrogel is absorbed.

Embodiment 24 provides the method of any one of Embodiments 21-23, wherein the hydrating comprises the hydrogel taking up sufficient aqueous composition such that the hydrogel increases in volume by about 2 to about 2000 times.

Embodiment 25 provides the method of any one of Embodiments 21-24, wherein the hydrating comprises the hydrogel taking up sufficient aqueous composition such that the hydrogel increases in volume by about 10 to about 800 times.

Embodiment 26 provides the method of any one of Embodiments 21-25, wherein the composition comprising the hydrated hydrogel has a viscosity at standard temperature and pressure of at least about 50 cP.

Embodiment 27 provides the method of any one of Embodiments 21-26, wherein the composition comprising the hydrated hydrogel has a viscosity at standard temperature and pressure of about 50 cP to about 1,000,000,000 cP.

Embodiment 28 provides the method of any one of Embodiments 21-27, wherein the composition comprising the hydrated hydrogel has a viscosity downhole of at least about 50 cP.

Embodiment 29 provides the method of any one of Embodiments 21-28, wherein the composition comprising the hydrated hydrogel has a viscosity downhole of about 50 cP to about 1,000,000,000 cP.

Embodiment 30 provides the method of any one of Embodiments 21-29, wherein the hydrating at least partially occurs downhole.

Embodiment 31 provides the method of any one of Embodiments 21-30, wherein the hydrating occurs at least partially during placement of the composition in the subterranean formation.

Embodiment 32 provides the method of any one of Embodiments 21-31, wherein the hydrating occurs over a period of at least about 5 seconds to about 5 days.

Embodiment 33 provides the method of any one of Embodiments 31-32, wherein the subterranean formation comprises a flow pathway.

Embodiment 34 provides the method of Embodiment 33, wherein the flow pathway comprises a water source.

Embodiment 35 provides the method of any one of Embodiments 33-34, wherein the flow pathway comprises a pathway sufficient to divert from the wellbore at least one of a downhole fluid or a produced hydrocarbon.

Embodiment 36 provides the method of any one of Embodiments 33-35, wherein the composition comprising the hydrated hydrogel is sufficient to substantially plug the flow pathway.

Embodiment 37 provides the method of any one of Embodiments 33-36, further comprising placing a cement slurry in the subterranean formation, and allowing the slurry to set.

Embodiment 38 provides the method of any one of Embodiments 33-37, wherein the composition comprises a cement slurry.

Embodiment 39 provides the method of any one of Embodiments 1-38, wherein the method is a method for plugging a flow pathway in a wellbore.

Embodiment 40 provides the method of any one of Embodiments 1-39, wherein the method is a method of cementing a wellbore.

Embodiment 41 provides the method of any one of Embodiments 1-40, wherein the composition further comprises a carrier fluid.

Embodiment 42 provides the method of Embodiment 41, wherein the carrier fluid comprises at least one of an aqueous carrier fluid or an organic carrier fluid.

Embodiment 43 provides the method of any one of Embodiments 1-42, wherein the composition comprises about 0.001 pounds to about 5.0 pounds per gallon of carrier fluid.

Embodiment 44 provides the method of any one of Embodiments 1-43, wherein the composition comprises about 0.01 pounds to about 2.0 pounds per gallon of carrier fluid.

Embodiment 45 provides the method of any one of Embodiments 1-44, wherein the composition further comprises an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 46 provides the method of Embodiment 45, wherein the cementing fluid comprises Portland cement, pozzolana cement, gypsum cement, high alumina content cement, slag cement, silica cement, or a combination thereof.

Embodiment 47 provides the method of any one of Embodiments 1-46, wherein at least one of prior to, during, and after the placement of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 48 provides the method of any one of Embodiments 1-47, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 49 provides the method of any one of Embodiments 1-48, wherein the placing of the composition in the subterranean formation comprises fracturing at least part of the subterranean formation to form at least one subterranean fracture.

Embodiment 50 provides the method of any one of Embodiments 1-49, wherein the composition further comprises a proppant, a resin-coated proppant, an encapsulated resin, or a combination thereof.

Embodiment 51 provides the method of any one of Embodiments 1-50, wherein the composition comprises a payload material.

Embodiment 52 provides the method of Embodiment 51, further comprising using the composition to deposit at least part of the payload material downhole.

Embodiment 53 provides the method of Embodiment 52, wherein the at least part of the payload material is deposited in a subterranean fracture.

Embodiment 54 provides the method of any one of Embodiments 51-53, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 55 provides the method of any one of Embodiments 1-54, wherein the poly(alkenylamide)-polysaccharide hydrogel comprises a reaction product of the poly(alkenylamide) and the polysaccharide.

Embodiment 56 provides the method of Embodiment 55, wherein the poly(alkenylamide)-polysaccharide hydrogel comprises a reaction product of the poly(alkenylamide) and the polysaccharide wherein the poly(alkenylamide) is about 30 wt % to about 99.999 wt % of the total weight of the polysaccharide and the poly(alkenylamide).

Embodiment 57 provides the method of any one of Embodiments 55-56, wherein the poly(alkenylamide)-polysaccharide hydrogel comprises a reaction product of the poly(alkenylamide) and the polysaccharide wherein the poly(alkenylamide) is about 70 wt % to about 95 wt % of the total weight of the polysaccharide and the poly(alkenylamide).

Embodiment 58 provides the method of any one of Embodiments 55-57, wherein the poly(alkenylamide)-polysaccharide hydrogel comprises a reaction product of the poly(alkenylamide) and the polysaccharide and a methylene bisalkenylamide crosslinker, wherein the bisalkenylamide crosslinker is about 0.000,1 wt % to about 10 wt % of the poly(alkenylamide).

Embodiment 59 provides the method of any one of Embodiments 55-58, wherein the poly(alkenylamide)-polysaccharide hydrogel comprises a reaction product of the poly(alkenylamide) and the polysaccharide and a methylene bisalkenylamide crosslinker, wherein the bisalkenylamide crosslinker is about 0.01 wt % to about 0.12 wt % of the poly(alkenylamide).

Embodiment 60 provides the method of any one of Embodiments 55-59, wherein the poly(alkenylamide)-polysaccharide hydrogel comprises a reaction product of the poly(alkenylamide) and the polysaccharide and a salt that provides an ionic crosslinker, wherein the salt is about 0.01 wt % to about 40 wt % of the polysaccharide.

Embodiment 61 provides the method of any one of Embodiments 55-60, wherein the poly(alkenylamide)-polysaccharide hydrogel comprises a reaction product of the poly(alkenylamide) and the polysaccharide and a salt that provides an ionic crosslinker, wherein the salt is about 1 wt % to about 25 wt % of the polysaccharide.

Embodiment 62 provides the method of any one of Embodiments 1-61, wherein the poly(alkenylamide) comprises a reaction product of an alkenylamide having the structure

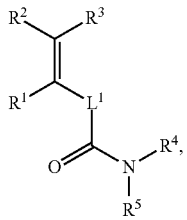

wherein each of $R^1$, $R^2$, $R^3$, $R^4$, and $R^5$ at each occurrence is independently selected from the group consisting of —H and $C_1$-$C_{10}$ hydrocarbyl; and at each occurrence $L^1$ is selected from the group consisting of a bond and $C_1$-$C_{10}$ hydrocarbylene.

Embodiment 63 provides the method of Embodiment 62, wherein the poly(alkenylamide) comprises a reaction product of an alkenylamide having the structure

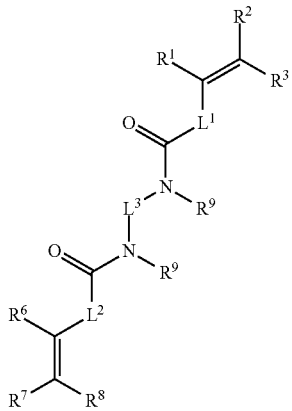

wherein each of $R^6$, $R^7$, $R^8$, and $R^9$ at each occurrence is independently selected from the group consisting of —H and $C_1$-$C_{10}$ hydrocarbyl; and each of $L^2$ and $L^3$ are independently at each occurrence selected from the group consisting of a bond and $C_1$-$C_{10}$ hydrocarbylene.

Embodiment 64 provides the method of any one of Embodiments 62-63, wherein each of $R^1$, $R^2$, $R^3$, $R^4$, and $R^5$ is —H; and $L^1$ is a bond.

Embodiment 65 provides the method of any one of Embodiments 63-64, wherein each of $R^6$, $R^7$, $R^8$, and $R^9$ is —H; $L^2$ is a bond; and $L^3$ is methylene.

Embodiment 66 provides the method of any one of Embodiments 1-65, wherein the poly(alkenylamide) is a poly(acrylamide)

Embodiment 67 provides the method of any one of Embodiments 1-66, wherein the poly(alkenylamide) comprises the structure -(PAA)$_n$-, wherein PAA has the structure

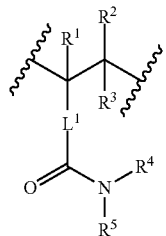

wherein at each occurrence PAA independently occurs in the orientation shown or in the opposite orientation; each of $R^1$, $R^2$, $R^3$, $R^4$, and $R^5$ at each occurrence is independently selected from the group consisting of —H and $C_1$-$C_{10}$ hydrocarbyl; at each occurrence $L^1$ is selected from the group consisting of a bond and $C_1$-$C_{10}$ hydrocarbylene; and n is at least about 2.

Embodiment 68 provides the method of Embodiment 67, wherein each of $R^1$, $R^2$, $R^3$, $R^4$, and $R^5$ at each occurrence is independently selected from the group consisting of —H, methyl, ethyl, and propyl; at each occurrence $L^1$ is selected from the group consisting of a bond, methylene, ethylene, and propylene; and n is about 2 to about 100,000,000.

Embodiment 69 provides the method of any one of Embodiments 67-68, wherein each of $R^1$, $R^2$, $R^3$, $R^4$, and $R^5$ is —H; $L^1$ is a bond; and n is about 10 to about 100,000.

Embodiment 70 provides the method of any one of Embodiments 67-69, wherein the poly(alkenylamide) comprises the structure -(PAA)$_n$-(CL)$_m$-, wherein the poly(alkenylamide) is a block or random copolymer; wherein CL has the structure

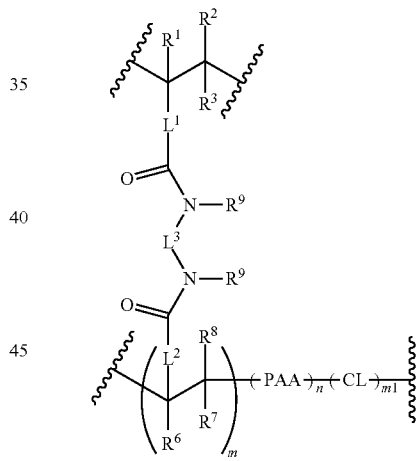

wherein each of PAA and CL at each occurrence independently occur in the orientation shown or in the opposite orientation; each of $R^6$, $R^7$, $R^8$, and $R^9$ at each occurrence is independently selected from the group consisting of —H and $C_1$-$C_{10}$ hydrocarbyl; each of $L^2$ and $L^3$ are independently at each occurrence selected from the group consisting of a bond and $C_1$-$C_{10}$ hydrocarbylene; m is at least about 1; and m1 is about 0 to about 10,000,000.

Embodiment 71 provides the method of Embodiment 70, wherein each of $R^6$, $R^7$, $R^8$, and $R^9$ at each occurrence is independently selected from the group consisting of —H, methyl, ethyl, and propyl; each of $L^2$ and $L^3$ are independently at each occurrence selected from the group consisting of a bond, methylene, ethylene, and propylene; m is about 1 to about 10,000,000; and m1 is about 0 to about 10,000,000.

Embodiment 72 provides the method of any one of Embodiments 70-71, wherein each of $R^6$, $R^7$, $R^8$, and $R^9$ is —H; $L^2$ is a bond; $L^3$ is methylene; m is about 1 to about 10,000; and m1 is about 0 to about 10,000.

Embodiment 73 provides the method of any one of Embodiments 70-72, wherein the poly(alkenylamide) has the structure E1-(PAA)$_n$-(CL)$_m$-E1, wherein CL has the structure

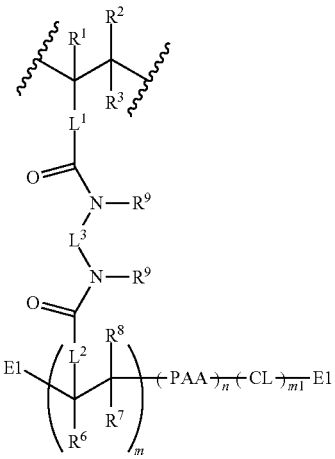

wherein at each occurrence E1 is independently selected from the group consisting of H, —R', —OH, and —OR' wherein R' at each occurrence is independently substituted or unsubstituted $C_1$-$C_{10}$ hydrocarbyl.

Embodiment 74 provides the method of any one of Embodiments 1-73, wherein the poly(alkenylamide) comprises the structure -(PAA)$_n$-(CL)$_m$-, wherein the poly(alkenylamide) is a block or random copolymer; wherein PAA has the structure

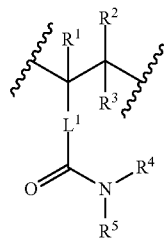

wherein each of $R^1$, $R^2$, $R^3$, $R^4$, and $R^5$ is —H; $L^1$ is a bond; and n is about 10 to about 100,000; and wherein CL has the structure

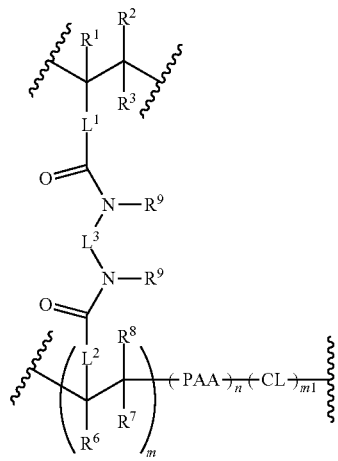

wherein each of PAA and CL at each occurrence independently occur in the orientation shown or in the opposite orientation; each of $R^6$, $R^7$, $R^8$, and $R^9$ is —H; $L^2$ is a bond; $L^3$ is methylene; m is about 1 to about 10,000; and m1 is about 0 to about 10,000.

Embodiment 75 provides the method of any one of Embodiments 1-74, wherein the poly(alkenylamide) comprises the structure -(PAA)$_n$-(CL)$_m$-, wherein the poly(alkenylamide) is a block or random copolymer; wherein PAA has the structure

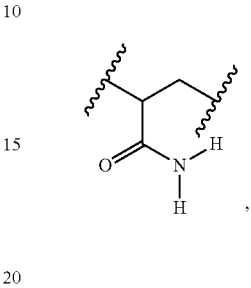

wherein n is about 10 to about 100,000; and wherein CL has the structure

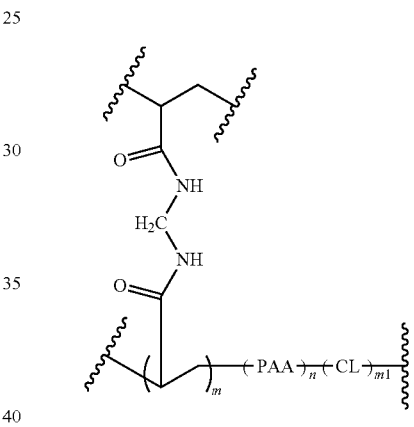

wherein m is about 1 to about 10,000, and m1 is about 0 to about 10,000.

Embodiment 76 provides the method of any one of Embodiments 1-75, wherein the poly(alkenylamide) has a molecular weight of about 500 g/mol to about 100,000,000 g/mol.

Embodiment 77 provides the method of any one of Embodiments 1-76, wherein the polysaccharide is at least one of acetan, alginate, alginic acid, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indican, kefiran, lentinan, levan, mauran, pullulan, scleroglucan, schizophyllan, stewartan, succinoglycan, xanthan, and welan.

Embodiment 78 provides the method of any one of Embodiments 1-77, wherein the polysaccharide is alginic acid or a salt thereof.

Embodiment 79 provides the method of any one of Embodiments 1-78, wherein the polysaccharide comprises Structure I Structure I

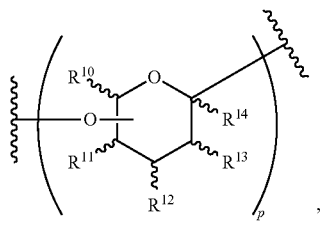

wherein each of $R^{10}$, $R^{11}$, $R^{12}$, $R^{13}$, and $R^{14}$ are independently selected from the group consisting of —H, —$R^{15}$, —$OR^{15}$, and —$C(O)R^{16}$, wherein at each occurrence $R^{15}$ is independently selected from the group consisting of —H and $C_1$-$C_{10}$ hydrocarbyl, and wherein at each occurrence $R^{16}$ is independently selected from the group consisting of —$O^-$, —OH, and —$O^-CI^+$, wherein at each occurrence $CI^+$ is independently a counterion, and wherein p is at least about 2.

Embodiment 80 provides the method of Embodiment 79, wherein the polysaccharide has the structure

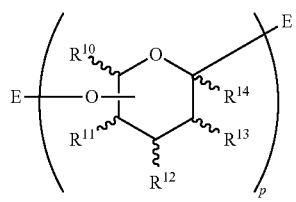

wherein E is independently at each occurrence selected from the group consisting of H, —R', —OH, and —OR' wherein R' at each occurrence is independently substituted or unsubstituted C, —$C_{10}$ hydrocarbyl, and wherein p is about 2 to about 100,000,000.

Embodiment 81 provides the method of any one of Embodiments 79-80, wherein Structure I is

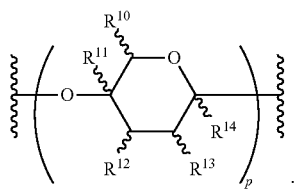

Embodiment 82 provides the method of any one of Embodiments 79-81, wherein Structure I is

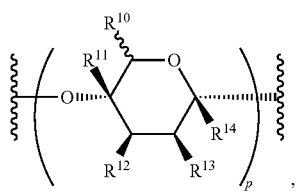

wherein each of $R^{10}$, $R^{11}$, $R^{12}$, $R^{13}$, and $R^{14}$ are independently selected from the group consisting of —H, and —OH, wherein $R^{10}$ at each occurrence is independently —$C(O)R^{16}$, wherein at each occurrence $R^{16}$ is independently selected from the group consisting of —$O^-$, —OH, and —$O^-CI^+$, wherein p is about 10 to about 100,000.

Embodiment 83 provides the method of Embodiment 82, wherein at each occurrence $CI^+$ is independently selected from the group consisting of $Na^+$, $K^+$, $Li^+$, $H^+$, $Zn^+$, $NH_4^+$, $Ca^{2+}$, $Mg^{2+}$, $Zn^{2+}$ and $Al^{3+}$.

Embodiment 84 provides the method of any one of Embodiments 82-83, wherein $CI^+$ is $Ca^{2+}$.

Embodiment 85 provides the method of any one of Embodiments 79-84, wherein Structure I is

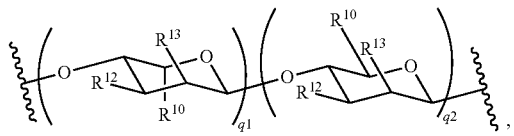

wherein q1+q2=p.

Embodiment 86 provides the method of any one of Embodiments 79-85, wherein $R^{10}$ is —$C(O)R^{16}$, wherein at each occurrence $R^{16}$ is independently selected from the group consisting of —$O^-$, —OH, and —$O^-CI^+$, wherein at each occurrence $CI^+$ is independently a counterion; $R^{11}$ and $R^{14}$ are —H; and $R^{12}$ and $R^{13}$ are —OH.

Embodiment 87 provides the method of any one of Embodiments 79-86, wherein Structure I is

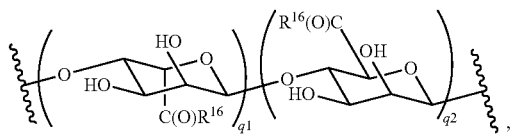

wherein at each occurrence $R^{16}$ is independently selected from the group consisting of —$O^-$, —OH, and —$O^-CI^+$, wherein at each occurrence $CI^+$ is independently a counterion, and q1+q2=p.

Embodiment 88 provides the method of any one of Embodiments 79-87, wherein the polysaccharide has a molecular weight of about 500 g/mol to about 100,000,000 g/mol.

Embodiment 89 provides the method of any one of Embodiments 79-88, wherein the polysaccharide has a molecular weight of about 1,000 g/mol to about 5,000,000 g/mol.

Embodiment 90 provides the method of any one of Embodiments 79-89, wherein the poly(alkenylamide)-polysaccharide hydrogel comprises at least one crosslink between the poly(alkenylamide) and the polysaccharide comprising an imide.

Embodiment 91 provides the method of Embodiment 90, wherein the imide is formed by reaction between a amide group of the poly(alkenylamide) and a carboxylic acid or salt thereof of the polysaccharide.

Embodiment 92 provides the method of any one of Embodiments 1-91, wherein the poly(alkenylamide)-polysaccharide hydrogel comprises the following structure -$(PAA)_{n1}$-$(CL)_{n2}$-$(PAA-PS)_{n3}$-, wherein PAA, CL, PAA-PS, and the repeating units of PAA, CL, and PAA-PS are in a block copolymer or random copolymer arrangement; wherein PAA has the structure

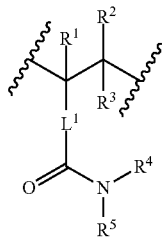

wherein CL has the structure

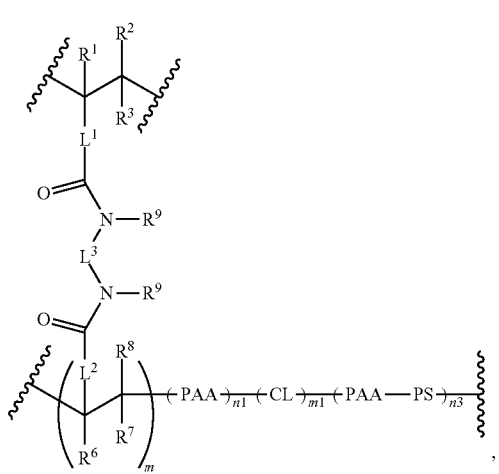

wherein at each occurrence PAA-PS is part of the same polysaccharide or a different polysaccharide, wherein PAA-PS has the structure

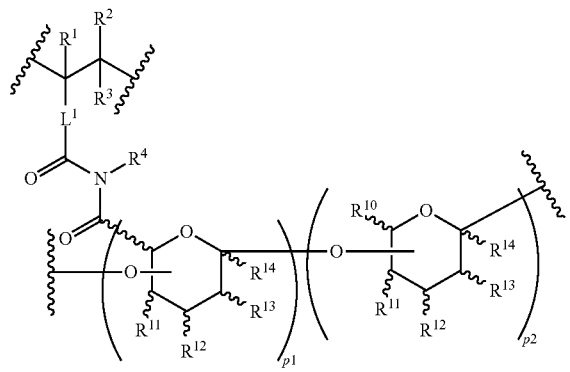

wherein at each occurrence each of PAA, CL, and PAA-PS independently occurs in the orientation shown or in the opposite orientation each of $R^1$, $R^2$, $R^3$, $R^4$, and $R^5$ at each occurrence is independently selected from the group consisting of —H and $C_1$-$C_{10}$ hydrocarbyl; each of $L^1$, $L^2$, and $L^3$ at each occurrence is selected from the group consisting of a bond and $C_1$-$C_{10}$ hydrocarbylene each of $R^{10}$, $R^{11}$, $R^{12}$, $R^{13}$, and $R^{14}$ are independently selected from the group consisting of —H, —$R^{15}$, —$OR^{15}$, and —$C(O)R^{16}$, wherein at each occurrence $R^{15}$ is independently selected from the group consisting of —H and $C_1$-$C_{10}$ hydrocarbyl, and wherein at each occurrence $R^{16}$ is independently selected from the group consisting of —$O^-$, —OH, and —$O^-CI^+$, wherein at each occurrence $CI^+$ is independently a counterion; wherein n1+n3 is at least about 2, n2 is about 0 to about 100,000,000, and p1+p2 is at least about 2.

Embodiment 93 provides the method of Embodiment 92, wherein each of $R^1$, $R^2$, $R^3$, $R^4$, $R^6$, $R^7$, $R^8$, and $R^9$ is —H; $R^{10}$ is —$C(O)R^{16}$, and at each occurrence $R^{16}$ is independently selected from the group consisting of —$O^-$, —OH, and —$O^-CI^+$; $L^1$ and $L^2$ is a bond; $L^3$ is methylene; n1+n3 is about 10 to about 100,000, n2 is about 0 to about 10,000, and p1+p2 is about 10 to about 100,000.

Embodiment 94 provides the method of any one of Embodiments 92-93, wherein wherein PAA has the structure

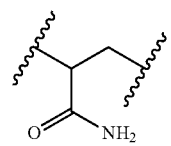

wherein CL has the structure

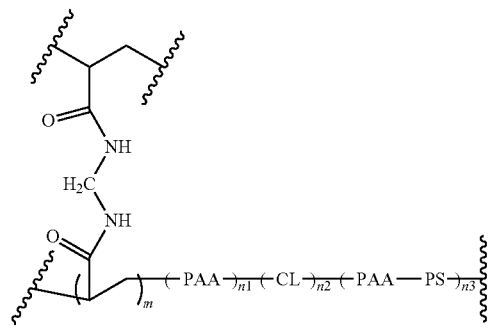

wherein at each occurrence PAA-PS is part of the same polysaccharide or a different polysaccharide, wherein PAA-PS has the structure

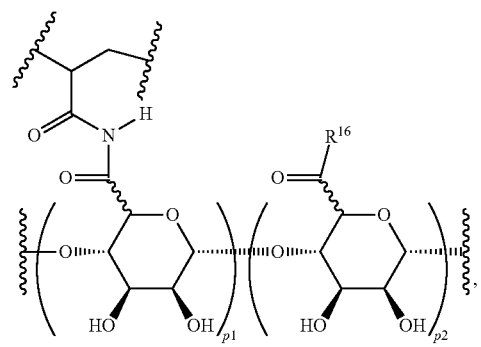

wherein at each occurrence $R^{16}$ is independently selected from the group consisting of —$O^-$, —OH, and —$O^-CI^+$, wherein at each occurrence $CI^+$ is independently a counterion, n1+n3 is about 10 to about 100,000, n2 is about 0 to about 10,000, and p1+p2 is about 10 to about 100,000.

Embodiment 95 provides a method of plugging a flow pathway in a subterranean formation, the method comprising: obtaining or providing a composition comprising a poly(alkenylamide)-polysaccharide hydrogel; placing the composition in a subterranean formation, wherein the subterranean formation comprises a flow pathway; and at least partially hydrating the hydrogel, to provide a composition comprising a hydrated hydrogel sufficient to substantially plug the flow pathway.

Embodiment 96 provides a method of treating a subterranean formation, the method comprising: obtaining or providing a composition comprising a poly(alkenylamide)-polysaccharide hydrogel comprising the following structure -(PAA)$_{n1}$-(CL)$_{n2}$-(PAA-PS)$_{n3}$-, wherein PAA, CL, PAA-PS, and the repeating units of PAA, CL, and PAA-PS are in a block copolymer or random copolymer arrangement; wherein PAA has the structure

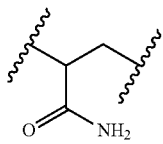

wherein CL has the structure

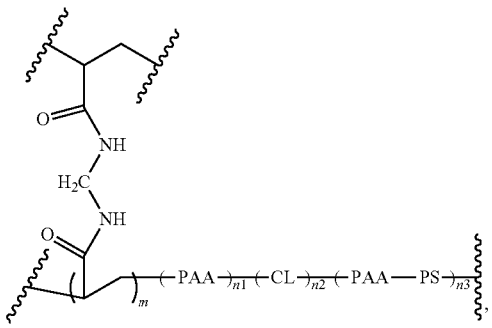

wherein at each occurrence PAA-PS is part of the same polysaccharide or a different polysaccharide, wherein PAA-PS has the structure

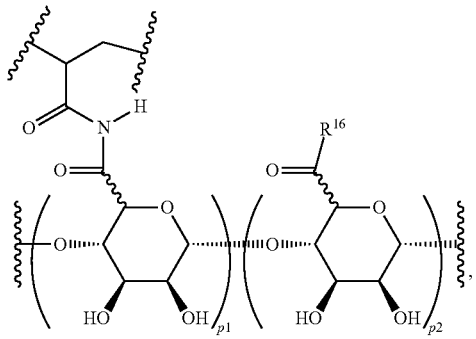

wherein at each occurrence $R^{16}$ is independently selected from the group consisting of —O$^-$, —OH, and —O$^-$CI$^+$, wherein at each occurrence CI$^+$ is independently a counterion, n1+n3 is about 10 to about 100,000, n2 is about 0 to about 10,000, and p1+p2 is about 10 to about 100,000; and placing the composition in a subterranean formation.

Embodiment 97 provides a composition for treatment of a subterranean formation, the composition comprising: a poly(alkenylamide)-polysaccharide hydrogel, wherein the poly(alkenylamide) comprises the structure -(PAA)$_n$-, wherein PAA comprises the structure

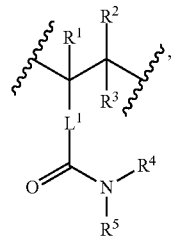

wherein at each occurrence PAA independently occurs in the orientation shown or in the opposite orientation; each of $R^1$, $R^2$, $R^3$, $R^4$, and $R^5$ at each occurrence is independently selected from the group consisting of —H and $C_1$-$C_{10}$ hydrocarbyl; at each occurrence $L^1$ is selected from the group consisting of a bond and $C_1$-$C_{10}$ hydrocarbylene; and n is at least about 2; wherein the polysaccharide comprises Structure I Structure I

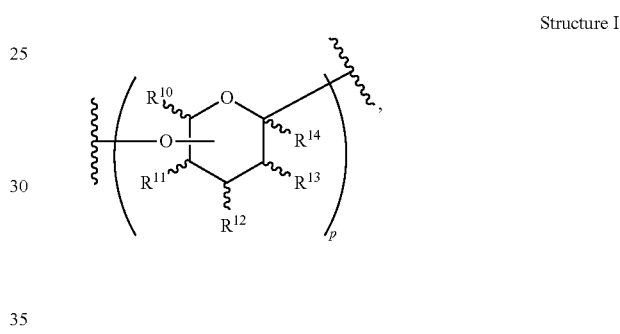

wherein each of $R^{10}$, $R^{11}$, $R^{12}$, $R^{13}$, and $R^{14}$ are independently selected from the group consisting of —H, —$R^{15}$, —O$R^{15}$, and —C(O)$R^{16}$, wherein at each occurrence $R^{15}$ is independently selected from the group consisting of —H and $C_1$-$C_{10}$ hydrocarbyl, and wherein at each occurrence $R^{16}$ is independently selected from the group consisting of —O$^-$, —OH, and —O$^-$CI$^+$, wherein at each occurrence CI$^+$ is independently a counterion, and wherein p is at least about 2; wherein the poly(alkenylamide)-polysaccharide hydrogel comprises at least one crosslink between the poly(alkenylamide) and the polysaccharide comprising an imide.

Embodiment 98 provides a composition for treatment of a subterranean formation, the composition comprising: a poly(alkenylamide)-polysaccharide hydrogel comprising the following structure -(PAA)$_{n1}$-(CL)$_{n2}$-(PAA-PS)$_{n3}$-, wherein PAA, CL, PAA-PS, and the repeating units of PAA, CL, and PAA-PS, are in a block copolymer or random copolymer arrangement; wherein PAA has the structure

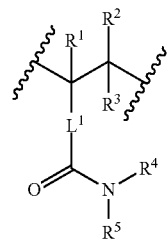

wherein CL has the structure

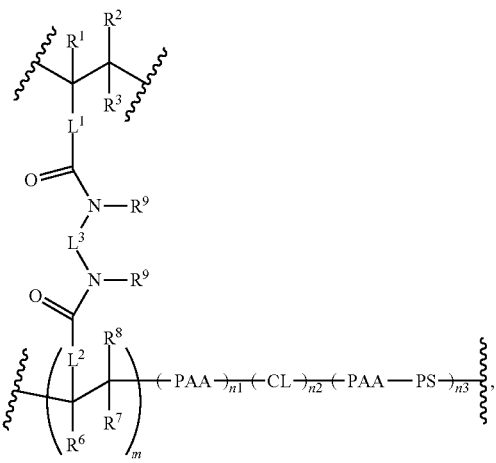

wherein at each occurrence PAA-PS is part of the same polysaccharide or a different polysaccharide, wherein PAA-PS has the structure

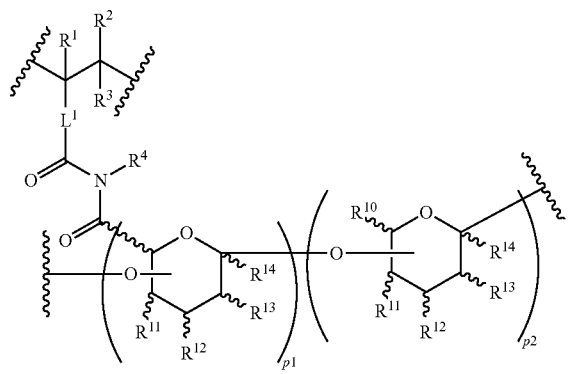

wherein at each occurrence each of PAA, CL, and PAA-PS independently occurs in the orientation shown or in the opposite orientation; each of $R^1$, $R^2$, $R^3$, $R^4$, and $R^5$ at each occurrence is independently selected from the group consisting of —H and $C_1$-$C_{10}$ hydrocarbyl; each of $L^1$, $L^2$, and $L^3$ at each occurrence is selected from the group consisting of a bond and $C_1$-$C_{10}$ hydrocarbylene; each of $R^{10}$, $R^{11}$, $R^{12}$, $R^{13}$, and $R^{14}$ are independently selected from the group consisting of —H, —$R^{15}$, —$OR^{15}$, and —C(O)$R^{16}$, wherein at each occurrence $R^{15}$ is independently selected from the group consisting of —H and $C_1$-$C_{10}$ hydrocarbyl, and wherein at each occurrence $R^{16}$ is independently selected from the group consisting of —$O^-$, —OH, and —$O^-CI^+$, wherein at each occurrence $CI^+$ is independently a counterion; wherein n1+n3 is at least about 2, n2 is about 0 to about 100,000,000, and p1+p2 is at least about 2.

Embodiment 99 provides the composition of Embodiment 98, wherein the composition further comprises a downhole fluid.

Embodiment 100 provides a composition for treatment of a subterranean formation, the composition comprising: a poly(alkenylamide)-polysaccharide hydrogel, wherein the poly(alkenylamide) comprises the structure -(PAA)$_n$-(CL)$_m$-, wherein the poly(alkenylamide) is a block or random copolymer; wherein PAA has the structure

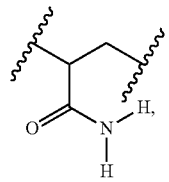

wherein n is about 10 to about 100,000; and wherein CL has the structure

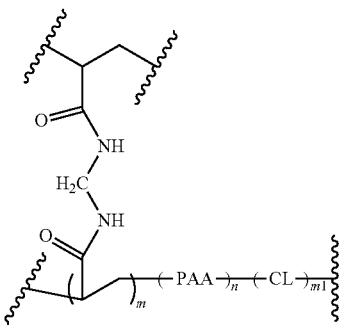

wherein m is about 1 to about 10,000, and m1 is about 0 to about 10,000; wherein the polysaccharide comprises Structure I

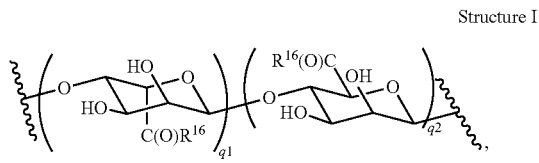

Structure I wherein at each occurrence $R^{16}$ is independently selected from the group consisting of —$O^-$, —OH, and —$O^-CI^+$, wherein at each occurrence $CI^+$ is independently a counterion, and q1+q2=about 10 to about 100,000; wherein the poly(alkenylamide)-polysaccharide hydrogel comprises at least one crosslink between the poly(alkenylamide) and the polysaccharide comprising an imide.

Embodiment 101 provides a method of preparing a composition for treatment of a subterranean formation, the method comprising: forming a composition comprising a poly(alkenylamide)-polysaccharide hydrogel.

Embodiment 102 provides the apparatus or method of any one or any combination of Embodiments 1-101 optionally configured such that all elements or options recited are available to use or select from.

What is claimed is:

1. A method of treating a subterranean formation, the method comprising:
placing in the subterranean formation a composition comprising a poly(alkenylamide)-polysaccharide hydrogel; and
plugging a flow pathway in the subterranean formation with the hydrogel;

wherein
the poly(alkenylamide) comprises the structure
-(PAA)$_n$-(CL)$_m$-,
the poly(alkenylamide) is a block or random copolymer,
PAA has the structure

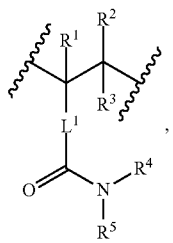

CL has the structure:

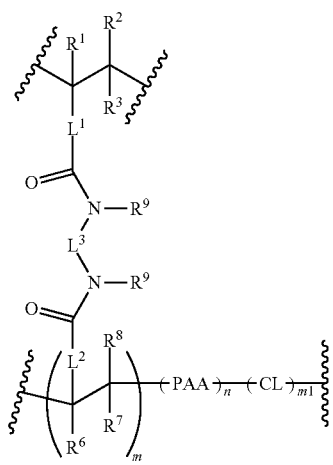

the poly(alkenylamide)-polysaccharide hydrogel comprises at least one crosslink comprising an imide between the poly(alkenylamide) and the polysaccharide,
each of PAA and CL at each occurrence independently occur in the orientation shown or in the opposite orientation,
the polysaccharide comprises Structure I Structure I

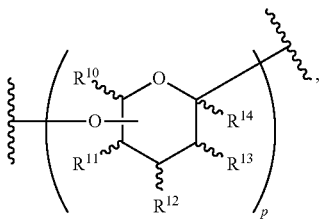

each of R$^{10}$, R$^{11}$, R$^{12}$, R$^{13}$, and R$^{14}$ are independently selected from the group consisting of —H, —R$^{15}$, —OR$^{15}$, and —C(O)R$^{16}$,
at each occurrence R$^{15}$ is independently selected from the group consisting of —H and C$_1$-C$_{10}$ hydrocarbyl,
at each occurrence R$^{16}$ is independently selected from the group consisting of —O$^-$, —OH, and —O$^-$Cl$^+$, at each occurrence Cl$^+$ is independently a counterion,
p is at least about 2,
each of R$^1$, R$^2$, R$^3$, R$^4$, R$^5$, R$^6$, R$^7$, R$^8$, and R$^9$ at each occurrence is independently selected from the group consisting of —H and C$_1$-C$_{10}$ hydrocarbyl,
each of L$^1$, L$^2$, and L$^3$ are independently at each occurrence selected from the group consisting of a bond and C$_1$-C$_{10}$ hydrocarbylene,
m is at least about 1,
n is at least about 2, and
m1 is about 0 to about 10,000,000.

2. The method of claim 1, wherein the polysaccharide has the structure

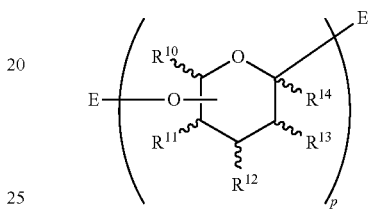

wherein E is independently at each occurrence selected from the group consisting of H, —R', —OH, and —OR' wherein R' at each occurrence is independently substituted or unsubstituted C$_1$-C$_{10}$ hydrocarbyl, and wherein p is about 2 to about 100,000,000.

3. The method of claim 1, wherein Structure I is

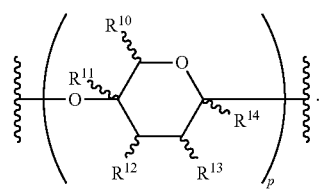

4. The method of claim 1, wherein Structure I is

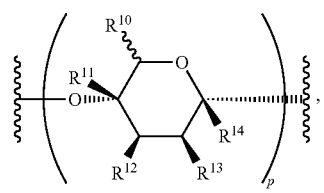

wherein each of R$^{11}$, R$^{12}$, R$^{13}$, and R$^{14}$ are independently selected from the group consisting of —H, and —OH, wherein R$^{10}$ at each occurrence is independently —C(O)R$^{16}$, wherein at each occurrence R$^{16}$ is independently selected from the group consisting of —O$^-$, —OH, and —O$^-$Cl$^+$, wherein p is about 10 to about 100,000.

5. The method of claim 4, wherein at each occurrence Cl$^+$ is independently selected from the group consisting of Na$^+$, K$^+$, Li$^+$, H$^+$, Zn$^+$, NH$_4^+$, Ca$^{2+}$, Mg$^{2+}$, Zn$^{2+}$ and Al$^{3+}$.

6. The method of claim 4, wherein Cl$^+$ is Ca$^{2+}$.

7. The method of claim 1, wherein Structure I is

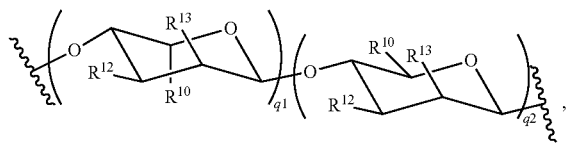

wherein q1 is about 1 to about 100,000,000, q2 is about 1 to about 100,000,000, and q1+q2=p.

8. The method of claim 1, wherein $R^{10}$ is —C(O)$R^{16}$, wherein at each occurrence $R^{16}$ is independently selected from the group consisting of —O, —OH, and —O⁻CI⁺, wherein at each occurrence CI⁺ is independently a counterion; $R^{11}$ and $R^{14}$ are —H; and $R^{12}$ and $R^{13}$ are —OH.

9. A The method of claim 1, wherein Structure I is

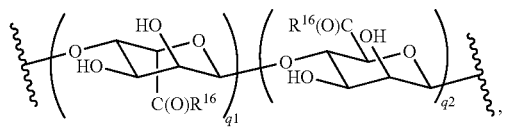

wherein at each occurrence $R^{16}$ is independently selected from the group consisting of —O⁻, —OH, and —O⁻CI⁺, wherein at each occurrence CI⁺ is independently a counterion, q1 is about 1 to about 100,000,000, q2 is about 1 to about 100,000,000, and q1+q2=p.

10. The method of claim 1, wherein the polysaccharide has a molecular weight of about 500 g/mol to about 100,000.000 g/mol.

11. The method of claim 1, wherein the polysaccharide has a molecular weight of about 1,000 g/mol to about 5,000,000 g/mol.

12. The method of claim 1, wherein the imide is formed by reaction between an amide group of the poly(alkenylamide) and a carboxylic acid or salt thereof of the polysaccharide.

13. The method of claim 1, wherein the polysaccharide is alginic acid or a salt thereof.

14. The method of claim 1, wherein the poly(alkenylamide)-polysaccharide hydrogel comprises the following structure -(PAA)$_{n1}$-(CL)$_{n2}$-(PAA-PS)$_{n3}$-, wherein PAA, CL, PAA-PS, and the repeating units of PAA, CL, and PAA-PS are in a block copolymer or random copolymer arrangement; wherein PAA has the structure

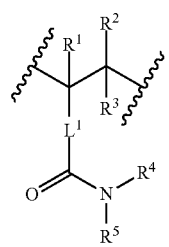

wherein CL has the structure

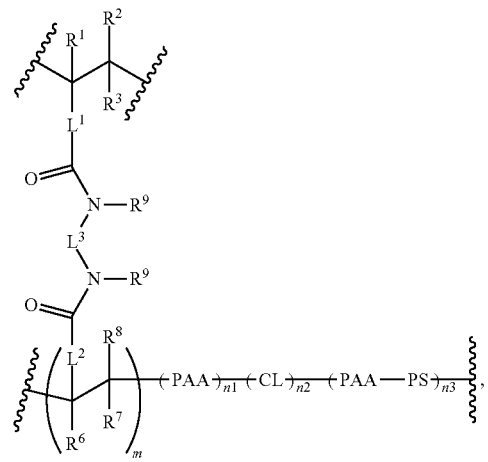

wherein at each occurrence PAA-PS is part of the same polysaccharide or a different polysaccharide, wherein PAA-PS has the structure

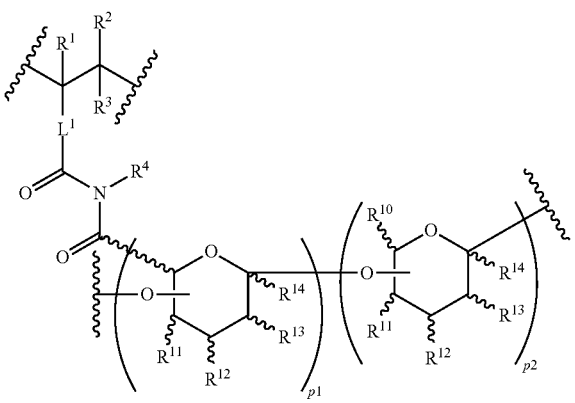

wherein
at each occurrence each of PAA, CL, and PAA-PS independently occurs in the orientation shown or in the opposite orientation;
each of $R^1$, $R^2$, $R^3$, $R^4$, and $R^5$ at each occurrence is independently selected from the group consisting of —H and $C_1$-$C_{10}$ hydrocarbyl;
each of $L^1$, $L^2$, and $L^3$ at each occurrence is selected from the group consisting of a bond and $C_1$-$C_{10}$ hydrocarbylene;
each of $R^{10}$, $R^{11}$, $R^{12}$, $R^{13}$, and $R^{14}$ are independently selected from the group consisting of —H, —$R^{15}$, —O$R^{15}$, and —C(O)$R^{16}$, wherein at each occurrence $R^{15}$ is independently selected from the group consisting of —H and $C_1$-$C_{10}$ hydrocarbyl, and wherein at each occurrence $R^{16}$ is independently selected from the group consisting of —O⁻, —OH, and —O⁻CI⁺, wherein at each occurrence CI⁺ is independently a counterion;
n1 is about 0 to about 100,000,000, n3 is about 1 to about 100,000,000, and n1+n3 is at least about 2;
n2 is about 0 to about 100,000,000; and
p1 is about 1 to about 100,000,000, p2 is about 1 to about 100,000,000, and p1+p2 is at least about 2.

15. The method of claim 14, wherein
each of $R^1$, $R^2$, $R^3$, $R^4$, $R^6$, $R^7$, $R^8$, and $R^9$ is —H;
$R^{10}$ is —C(O)$R^{16}$, and at each occurrence $R^{16}$ is independently selected from the group consisting of —O⁻, —OH, and —O⁻CI⁺;
$L^1$ and $L^2$ is a bond;
$L^3$ is methylene;
n1 is about 0 to about 100,000, n3 is about 1 to about 100,000, and n1+n3 is about 10 to about 100,000;
n2 is about 0 to about 10,000; and
p1 is about 1 to about 100,000, p2 is about 1 to about 100,000, and p1+p2 is about 10 to about 100,000.

16. The method of claim 14, wherein PAA has the structure

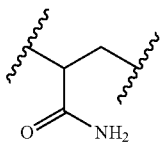

wherein CL has the structure

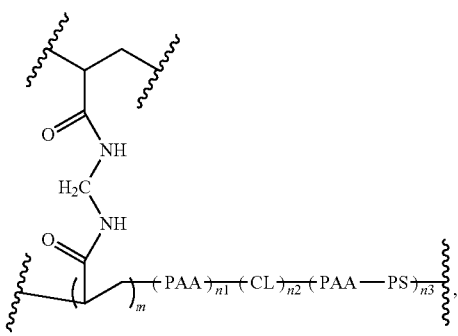

wherein at each occurrence PAA-PS is part of the same polysaccharide or a different polysaccharide, wherein PAA-PS has the structure

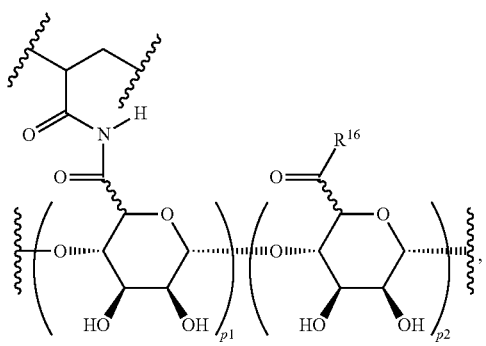

wherein at each occurrence $R^{16}$ is independently selected from the group consisting of —O⁻, —OH, and —O⁻CI⁺, wherein at each occurrence CI⁺ is independently a counterion, n1 is about 0 to about 100,000, n3 is about 1 to about 100,000, n1+n3 is about 10 to about 100,000, n2 is about 0 to about 10,000, p1 is about 1 to about 100,000, p2 is about 1 to about 100,000, and p1+p2 is about 10 to about 100,000.

17. A method of treating a subterranean formation, the method comprising:
placing in the subterranean formation a composition comprising a poly(alkenylamide)-polysaccharide hydrogel comprising the following structure -(PAA)$_{n1}$-(CL)$_{n2}$-(PAA-PS)$_{n3}$-; and
plugging a flow pathway in the subterranean formation with the hydrogel;
wherein PAA, CL, PAA-PS, and the repeating units of PAA, CL, and PAA-PS are in a block copolymer or random copolymer arrangement;
wherein PAA has the structure

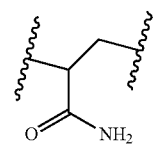

wherein CL has the structure

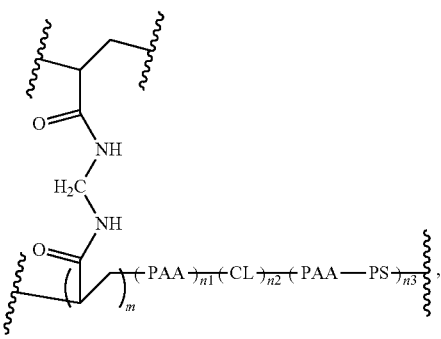

wherein at each occurrence PAA-PS is part of the same polysaccharide or a different polysaccharide, wherein PAA-PS has the structure

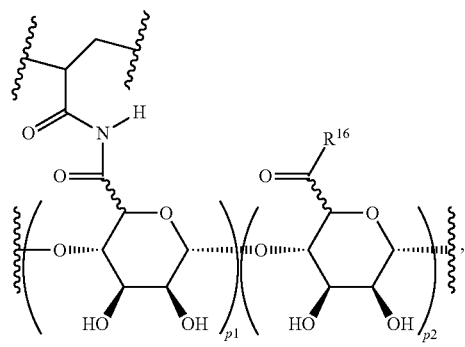

wherein at each occurrence $R^{16}$ is independently selected from the group consisting of —O⁻, —OH, and —O⁻CI⁺, wherein at each occurrence CI⁺ is independently a counterion, n1 is about 0 to about 100,000, n3 is about 1 to about 100,000, n1+n3 is about 10 to about 100,000, n2 is about 0 to about 10,000, m is about 1 to about 10,000, p1 is about 1 to about 100,000, p2 is about 1 to about 100,000, and p1+p2 is about 10 to about 100,000.

* * * * *